United States Patent [19]

Lipovski

[11] 4,016,545
[45] Apr. 5, 1977

[54] PLURAL MEMORY CONTROLLER APPARATUS

[75] Inventor: G. Jack Lipovski, Gainesville, Fla.

[73] Assignee: Harris Corporation, Cleveland, Ohio

[22] Filed: July 31, 1975

[21] Appl. No.: 600,632

[52] U.S. Cl. .................................... 340/172.5
[51] Int. Cl.[2] .............. G06F 13/00; G06F 9/20
[58] Field of Search ........................ 340/172.5

[56] References Cited

UNITED STATES PATENTS

| | | | |
|---|---|---|---|
| 3,737,871 | 6/1973 | Katzman | 340/172.5 |
| 3,778,776 | 12/1973 | Hakozaki | 340/172.5 |
| 3,818,460 | 6/1974 | Beard et al. | 340/172.5 |
| 3,889,243 | 6/1975 | Drimak | 340/172.5 |
| 3,975,714 | 8/1976 | Weber et al. | 340/172.5 |

*Primary Examiner*—Gareth D. Shaw
*Assistant Examiner*—C. T. Bartz
*Attorney, Agent, or Firm*—Leitner, Palan & Martin

[57] ABSTRACT

A general purpose digital computer whose architecture provides a set of pointer registers at each memory chip to perform stack operations previously performed on the CPU chip. Bidirectional lines interconnect the CPU chip and the memory chips for transmission and reception of data and control signals. Each memory chip has a circuit for incrementing or decrementing the pointer registers in response to a control signal without the transmission of a data signal from the CPU chip to perform a series of stack operations in the memory chip. Addressable registers are provided in each memory chip for identifying the memory chip (PAGE), storing a mode vector (MODE), and counting the number of times the memory controller was addressed (TIME).

22 Claims, 39 Drawing Figures

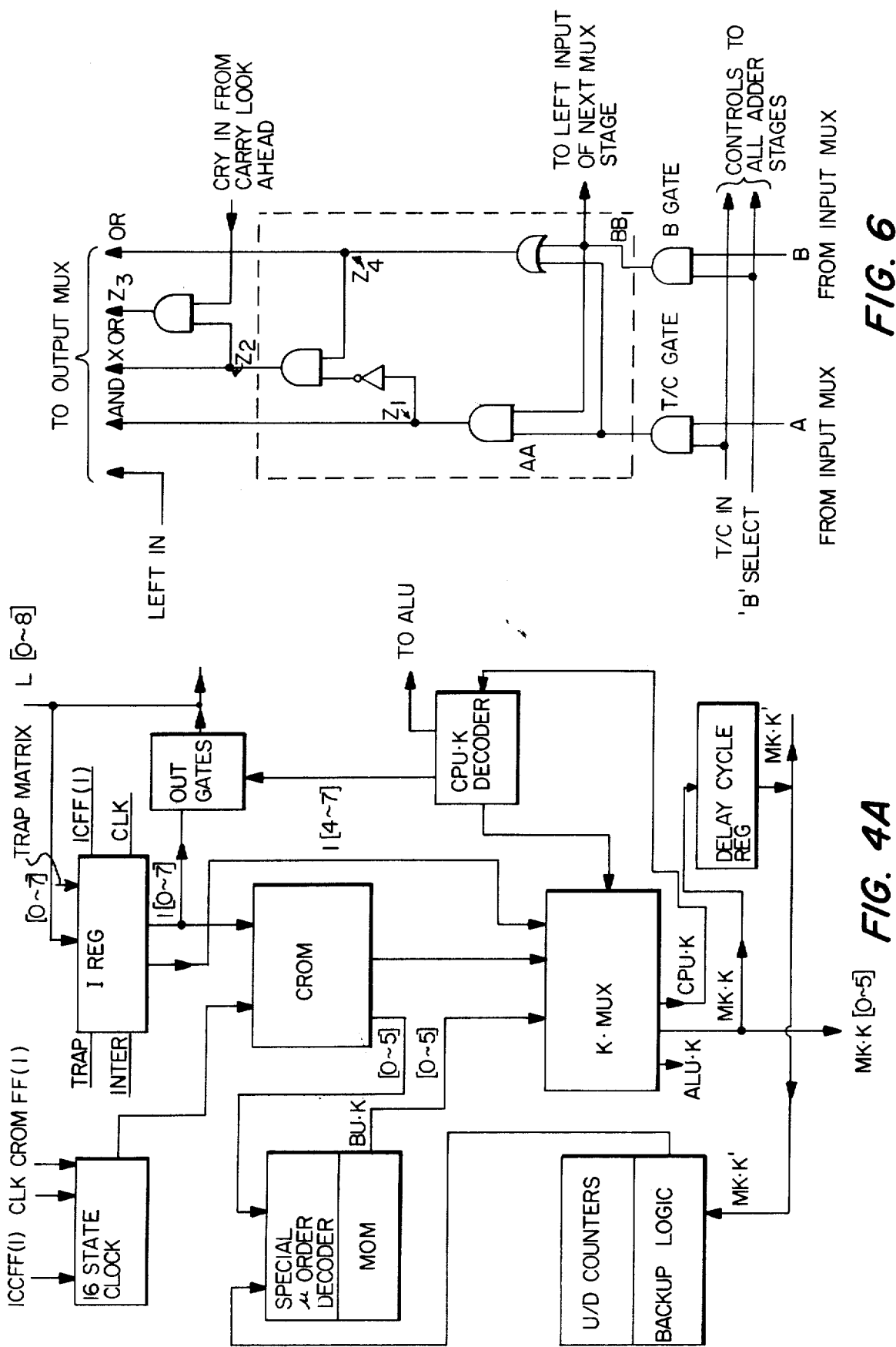

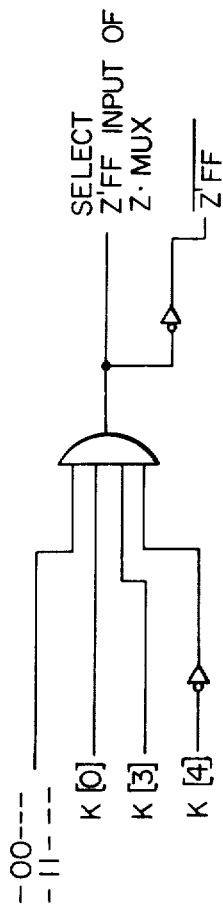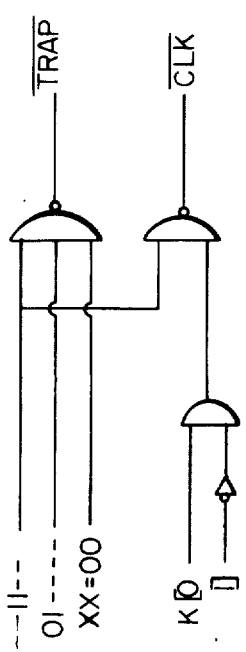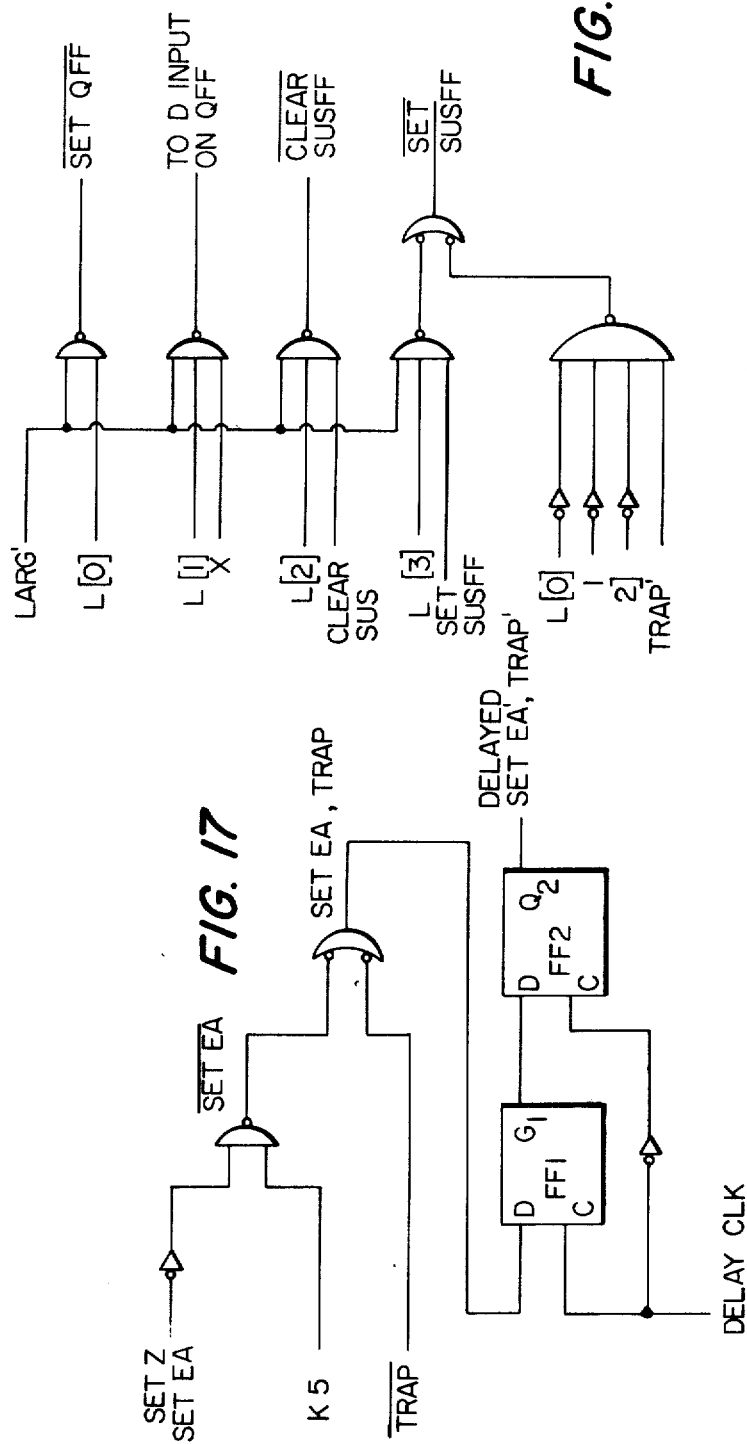

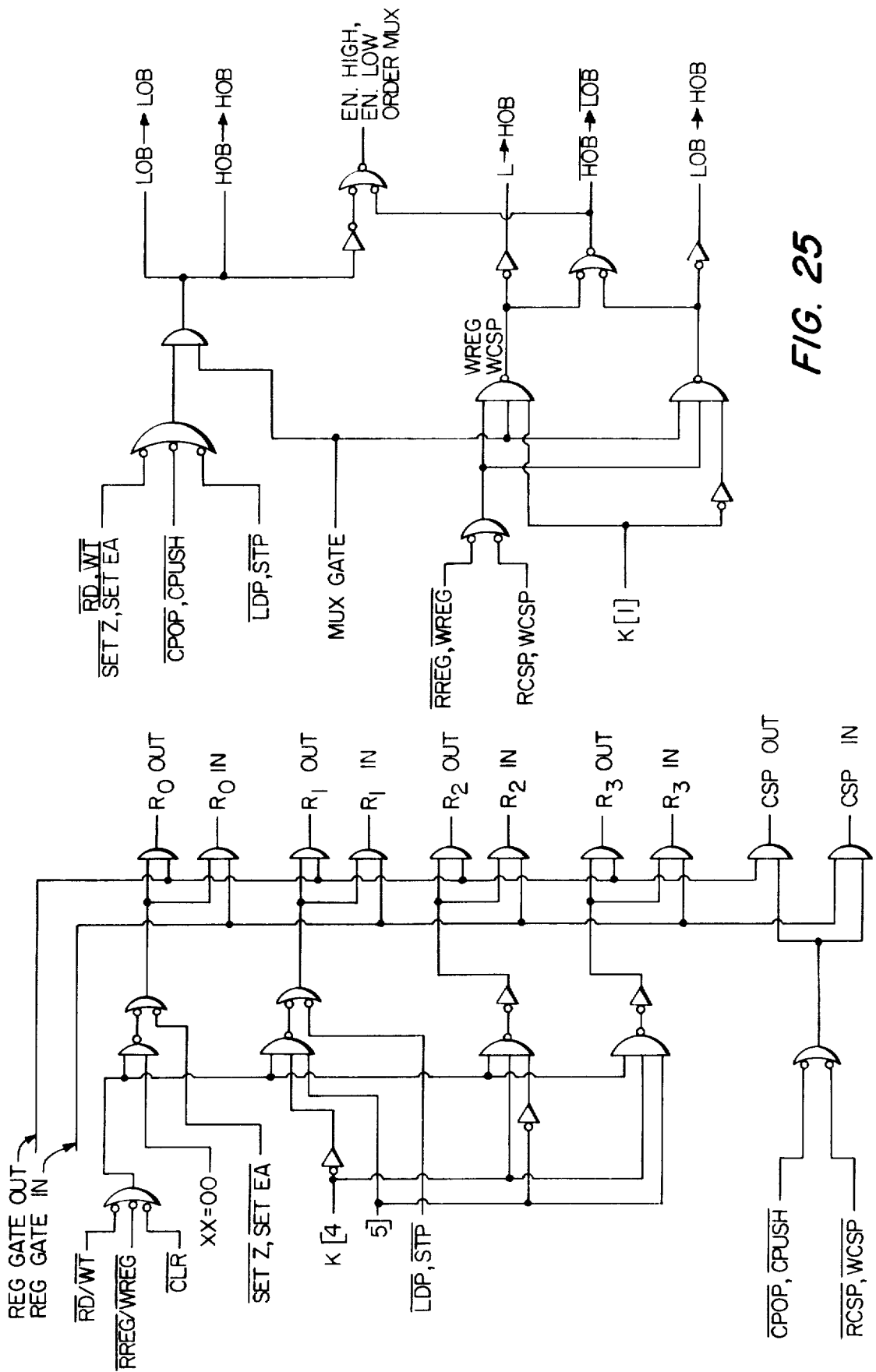

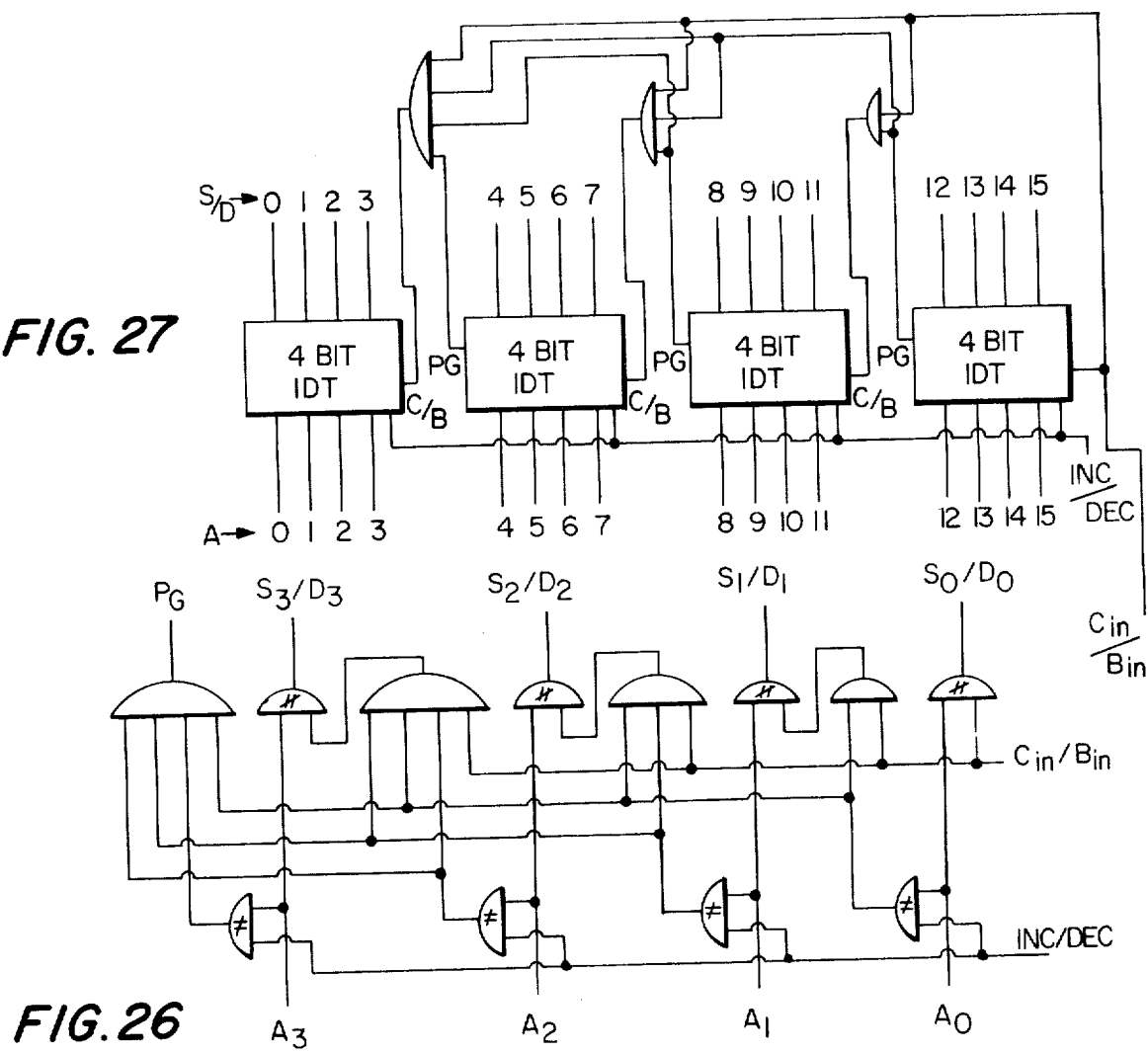
FIG. 27
FIG. 26
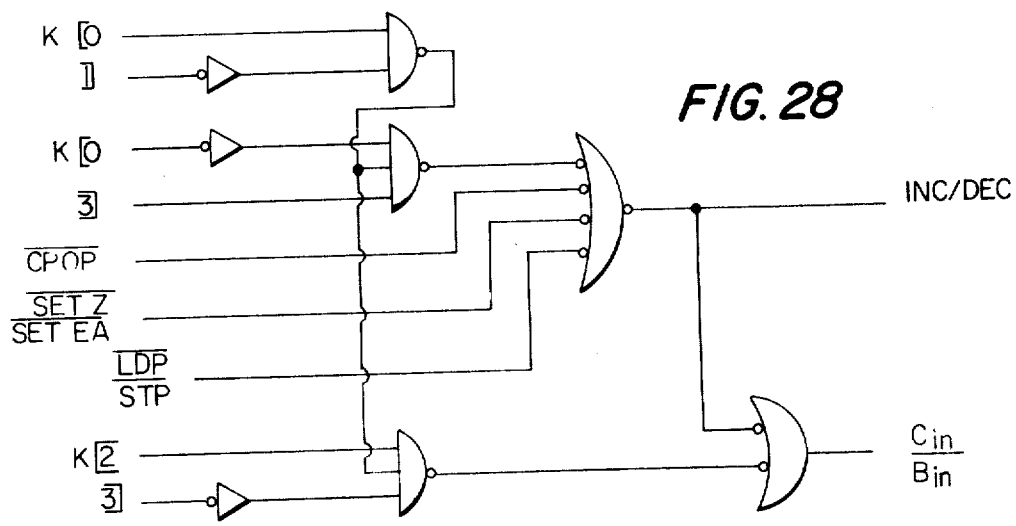
FIG. 28

ACTUAL CONNECTION (CARRY-LOOK AHEAD TREE PRIORITY CIRCUIT)

A 3 CPU VIRTUAL MEMORY CONFIGURATION

PLURAL MEMORY CONTROLLER APPARATUS

BACKGROUND OF THE INVENTION

1. Field of the Invention

The present invention relates generally to digital computers and more specifically to a new architectural arrangement for providing large computer capability in microcomputers.

ENVIRONMENT

In the field of remote computer terminals connected to a central large computer, there exists a need for a more intelligent terminal requiring less of the large central computer's time.

An intelligent terminal would consist of a keyboard and a CRT supported by an eight bit computer with a limited amount of memory. It is also possible that several CRT's and keyboards will be supported by a single computer and memory. The terminal would be connected in a micronetwork to other terminals and to a large computer. Hard copy equipment and secondary (disc and extended core) memory would be concentrated at various points in the network rather than in each terminal.

The intelligent terminal would be extensively used for editing text in everyday secretarial work and in preparing programs and queries for a large computer. It would also find use as a communications vehicle through which executives can transmit and retain messages and diagrams or digitized pictures. It would likely be used in reservation systems and top-of-the-line point-of-sale terminals, as well as in data acquisition systems and inventory control.

With the processing power available in a microcomputer, it would be possible to "Human Engineer" the system so that the user need not be highly trained. The strategy will be to limit the need for the user to remember long code words, short mnemonics or precise formats, and to reduce the amount of typing needed to carry out data entry. The CRT would be used to display a number of alternatives, from which the user would type a number, or a YES/NO decision on the keyboard, or enter some text. The program would be written to lead the user through a series of decisions and explanations in a manner like that used in computer aided education. This is called tutorial programming.

A computer system to support this type of intelligent terminal would have the following characteristics. In order to store the large volume of character data needed to display questions and explanations, a virtual memory, together with a micronetwork to share the secondary storage, is needed. Data would be stored at various nodes in the network where it can be transmitted to and stored in the intelligent terminal as it is needed. A very large addressing space and a fast direct memory access (DMA) mechanism are needed. Even so, high code density and data density are required to minimize the amount of virtual memory needed to store the program and data. This requires a computer with an efficient instruction set, and the handling of compact data codes such as the variable length Huffman code which is known to be about four times as dense as EBICDIC coded information. Moreover, to be able to write complex tutorial programs, a high level language would be required. This high level language would be used to write, for example, a tutorial program which would help the secretaries in an office edit correspondence, memos and reports. Each tutorial program would be different, taking into account the practices of the office and the backgrounds of the users. To enable these programs to be easily written, a high level language would be required. Finally, the intelligent terminal should have a stand-alone interpreter with capabilities similar to those of a desk calculator.

The high level language should support variable precision data, particularly character data in Huffman code, in qualified name variables of PL/1 to make identification and data access easier. It should also support vectors, arrays and pointer variables as in APL. Program control should be capable of being exercised through all currently known high level language constructs. Re-entrancy and recursion would be required for operating system programs and information retrieval programs working through a data structure. Such a language would be ample for writing tutorial programs and would make it cheaper to write programs because it is a state-of-the-art language that many programmers would find more useful than assembler languages or even standard high level languages.

The microcomputer of the prior art does not provide the capacity, versatility and capabilities to meet the enumerated requirements. The cost of computers to perform the required function makes an intelligent terminal almost prohibitive or available to a limited market. Although the primary environment has been described as intelligent terminals, the present microcomputer has wide applications to other markets or environments.

2. Description of the Prior Art

The microprocessors of the prior art have been surveyed by the Electrical Research Association (ERA) and other groups. The ERA published their findings in a report titled "Microprocessors: An ERA Assessment of LSI Computer Components."In a nutshell, they found that these machines are not suitable for anything but the simplest computation. For example, ERA chose to show how a microprocessor can be used for a laboratory automation system in Section 5.3.1 of their report. Using the best available microprocessor, they found it necessary to add a desk calculator chip to perform their arithmetic. While this chip is not too expensive, there is a problem with a computer that is unable to compute.

Addressing modes are unnecessarily constrained. For example, the same microprocessor has but one index register R to get a word M(R;) from memory. As a result, moving a string of characters from one area of memory to another area, a common operation in text editors, involves calculating R, reading M(R;), calculating a new R', writing to M(R';), returning to R, incrementing it, reading M(R;), and so on. Further, the index register is divided into two disconnected eight-bit parts, L and H, for the operation of incrementing. It is first necessary to increment L, then test for a carry and if the carry is true, increment H. While this operation can be done by a subroutine, so that it appears to the user as an "instruction" it still consumes a great deal of time and it is easy to do this in hardware.

The subroutine is, of course, one of the most important techniques in a machine that does not have a great deal of memory. Arguments have to be passed to the subroutine. They are normally stored after the return address. The machine puts the return address in a stack that is inaccessible, so that passing arguments is difficult. Further, this stack is seven registers deep, so that it is not difficult to destroy a return address in a sequence of subroutine calls, except when the entire program is written under the constraint that the number of levels of subroutine calls, I/O interrupts, and RESTART operations is limited to seven at any time. This makes it difficult to write any general software to support the microprocessor.

As to a general conclusion, programming of the prior art microprocessors is very tedious. It may require two or three times as much programmer time to write a line of code in such a machine as it does, say, in a well designed minicomputer. This restricts the use of such machines to OEM users who are going to write very short programs and put these in a large number of machines. But even here, when the same time comes to re-program these machines (e.g., for a point-of-sale terminal when the tax rate is changed), the re-programming costs might so far outstrip the cost of the hardware that the complete machine could be replaced and a more easily programmed machine substituted for less cost.

Finally, the interrupt and I/O scheme on such machines is generally unsuitable for sensor-based computation, (i.e. where a number of I/O devices, like limit sensors, A to D converters and so on cause interrupts that do most of the work in the computer). There is provision for different interrupt levels, but not for arming/disarming and enabling/disabling given interrupts or classes of interrupts. A rather large number of TTL chips is required to interface even a simple teletype. This makes such machines unsuitable for micronetwork applications, because they cannot handle the handshaking required to ask for and set-up timing for a block transfer of data.

It is clear from the above analysis that a microprocessor must be architecturally defined. It must have greatly improved software, so that it will be possible to write general programs. It must have flexible, simple input-output hardware. Lastly, it should mate up with clearly specified marketing objectives.

SUMMARY OF THE INVENTION

The architecture of the present microcomputer provides large computer capabilities by removing a set of registers from the Control Processing Unit (CPU) and placing them in a plurality of memory controllers. This reduces the amount of data transmitted between the CPU and memory and thus the amount of time the CPU is used for data retrieval and general memory management. The memory controller has five registers used only as pointers and performs stack operations with the stack being entirely in primary memory. Two stacks are used; one for arithmetic operations and one for control instructions, such as subroutine calls.

The machine memory is virtual, although it can be easily configured as a regular non-virtual memory. Each 256 word page of physical memory is controlled by a memory controller. A typical system, with a one thousand five hundred and thirty six word memory, will then have six controllers, each controlling a different page. The memory controllers each contain the same five pointer registers, which are the program counter, an operational stack pointer for stack arithmetic, two list pointers for accessing data (one of which doubles as an auxiliary operational stack pointer for multiple precision) and a control stack pointer for keeping subroutine return addresses and so on. Because these pointers are kept in each memory controller, it is generally not necessary for the CPU to send the sixteen bit address to memory for each access.

This makes possible a memory cycle of about 300 nanoseconds, if a 300 nanosecond memory is available, without having a wide address buss from the CPU. The memory controller can be built on a 32 pin chip separate from the memory chip and have a simple connection to a 24 pin CPU on a third chip. The memory controller and a page of memory can be built into the same 22 pin chip, which will have the same simple connections to the 24 pin CPU. This configuration will reduce pin connections to a minimum, improving reliability and simplifying expansion in a truly cellular computer having substantial flexibility and power (See "A Fail-Soft Varistructure Cellular Computer", Proceedings of the First Annual Symposium on Computer Architecture, Dec. 9–11, 1973, pp. 161–165).

A non-virtual memory can be easily obtained by means of two such memory controllers. One is wired internally to give the high order eight bits of the address while the other is a conventional one giving the low order eight bits. Thus, only two controllers are required for 64,000 words of memory. Such a system is suitable for stand-alone or device controller applications.

The memory controller and its page of memory include five registers, which can be auto-incremented or auto-decremented as they provide addresses to memory for reading or writing. The information from CPU to memory controller that tells it which pointer to use, whether to increment or decrement the pointer, and whether to read or write, is on a six bit control buss. This six bit control buss and the eight bit data buss can be electronically switched in and out of the CPU to move blocks of pages from one system to another. In particular, it can be made to act alone as a kind of direct memory access, at about three hundred nanoseconds read/write rate. Several pages can be isolated, loaded from a fast buss, and reconnected to the CPU later to page in data in a virtual memory. Also, the CPU can be halted as data is loaded into a page while still being connected. The separate memory controllers can also have enable bits that disable certain registers for some pages for reading or writing when used with the CPU. This gives protection/privacy control for each page, and the capability to read on a first page with one pointer which is read enabled for the first page, while reading from a second page with another pointer which is read enabled for the second page, even if the pages have the same page number. The stack can therefore write in selected chips that cannot possibly overwrite the program, which is stored and enabled for other chips.

The operational stack is an efficient mechanism for string and multi-precision arithmetic. A typical push operation, say PUSH 2+, reads the word pointed to by pointer two, increments pointer two, then decrements pointer one, writing the word in the location now pointed to by pointer one. This instruction, including fetch and decode, takes four memory cycles or about 1.2 microseconds. Since pointers one and two can point to anywhere in memory, a memory-memory move of a string of data is done, by repeating the above instruction, more quickly than in most microcomputers or minicomputers. In an eight bit computer, multiple precision arithmetic is absolutely necessary for serious computation. By using two pointers, each of which is autoincremented, pointing to the source and destination of the arithmetic operation, it is possible to write simple multiprecision loops. The routine to add/subtract/OR/ . . . two numbers having $n$ bytes, $n>65,000$, is going to takes three single length instructions, and is executed on $8n+4$ memory cycles. This is dramatically better than any existing machine. The operations supported by this machine are the usual add/subtract operations with extensive logical capability and shift operations.

Decimal arithmetic is supported by a correction operation that follows the add operation. A program for multiprecision decimal addition of unpacked (one digit per word) data directly from the keyboard is stored in only fourteen bytes. Pushing and arithmetic logic operations result in setting sign, zero test, two's complement overflow, carry and parity condition codes, valid for the entire multiprecision result of an operation, that can be tested in conditional branch statements. In addition, there are instructions for loading, storing, adding to and subtracting from pointers for addressing flexibility. And there is provision for 64 user defined traps which effectively enable the user to write 64 of his own instructions as in microprogrammable machines. A trap does not have the speed advantage as a user microcoded instruction, but is much easier to write and has the same net effect. As a result of all these techniques, the storage efficiency of this machine is comparable to that of the most advanced in the industry.

The stack organization also facilitates the high level language which is desirable for tutorial programming. In particular, as a new routine is called, the pointer registers and status are easily saved on a control stack and restored when the return occurs. This facilitates handling re-entrant and recursive routines. Several levels of subroutines can be returned from in one operation by readjusting the stack pointer. Since the stack is practically infinite (64,000 words of virtual memory), it can be divided into separate stacks for handling co-routines. The operational second stack is used for arithmetic. Variable length scalar vector and array operations are done on this stack without the need for extensive indexing. Finally, since the operations on the stack are in memory, the stack can often be placed so that the output of the operation is computed in place so that it need not be moved after computation is completed. This can be used to make the virtual memory more efficient by concentrating the writing of data so that the mean time between paging is reduced.

The I/O mechanism for this machine is simple, but can be extended to handle very sophisticated systems. I/O device controller and data registers can be addressed as virtual memory locations. An arbitrary number of such registers can be used. They can be accessed as if they were in a stack or instructions can even be fetched from them. A very simple scheme can be used for interrupt poling, requiring few additional extra parts or a multiple level interrupt scheme with up to 128 I/O interrupt traps, arm and enable control and hardware priority can be used. Such I/O flexibility can be used to handle the requirements of micronetwork processing.

OBJECTS OF THE INVENTION

An object of the present invention is to provide a microcomputer having the capabilities of large computers.

Another object of the invention is to provide a microcomputer which reduces the amount of data transmission between the central processing unit and the memory.

A further object is to reduce the amount of time the central processing unit is involved in data handling and memory management.

Still another object is to provide an economically feasible computer for use in intelligent terminals.

Yet another object is to provide a CPU as one chip and a memory controller as another chip with the minimum of pin connection for each.

An even further object is to provide a memory controller and a page of memory on a single chip.

Another object is to provide a memory control separate from a CPU which is capable of multi-precision operations and independent memory addressing.

A further object is to provide an unlimited control stack outside the CPU.

An even further object is to provide a computer architecturally capable of n-CPU and pseudo-memory port configurations.

A still further object is to provide a microcomputer having memory protection and priority capabilities.

An even further object is to provide a microcomputer using a high level language.

Another object is to provide a memory controller capable of providing addresses for instruction fetching, stack manipulation, string searching and multi-precision operations upon being loaded by a single instruction from the CPU at the beginning of the sequence.

A further object is to provide a system where identical and interchangeable memory units are fail-soft.

An even further object is to provide a memory controller separate from the CPU which includes mode bits for controlling operation of the memory controller.

A still further object is to provide a microcomputer architecturally incorporating cellular design.

BRIEF DESCRIPTION OF THE DRAWINGS

FIG. 6 is a logic diagram of the CPU Basic Adder;

FIG. 15 is a logic diagram of the Trap and Clear Microorder decoder;

FIG. 16 is a logic diagram of the ABREAD and ABWRITE microorder decoder;

FIG. 17 is a logic diagram of the Delayed SETEA and TRAP microorder decoder;

FIG. 18 is a logic diagram for using the decoded Delayed microorders LARG' and TRAP';

FIG. 23 is a logic diagram of the Pointer Register gate decoder;

FIG. 25 is a logic diagram of the byte multiplex decoder;

FIG. 26 is a schematic of a four stage Increment/Decrement/Transfer (IDT) circuit;

FIG. 27 is a schematic of the interconnectors of four IDT stages of FIG. 26;

FIG. 28 is a logic diagram of the IDT control decoder;

DESCRIPTION OF THE PREFERRED EMBODIMENTS

Figure 1:
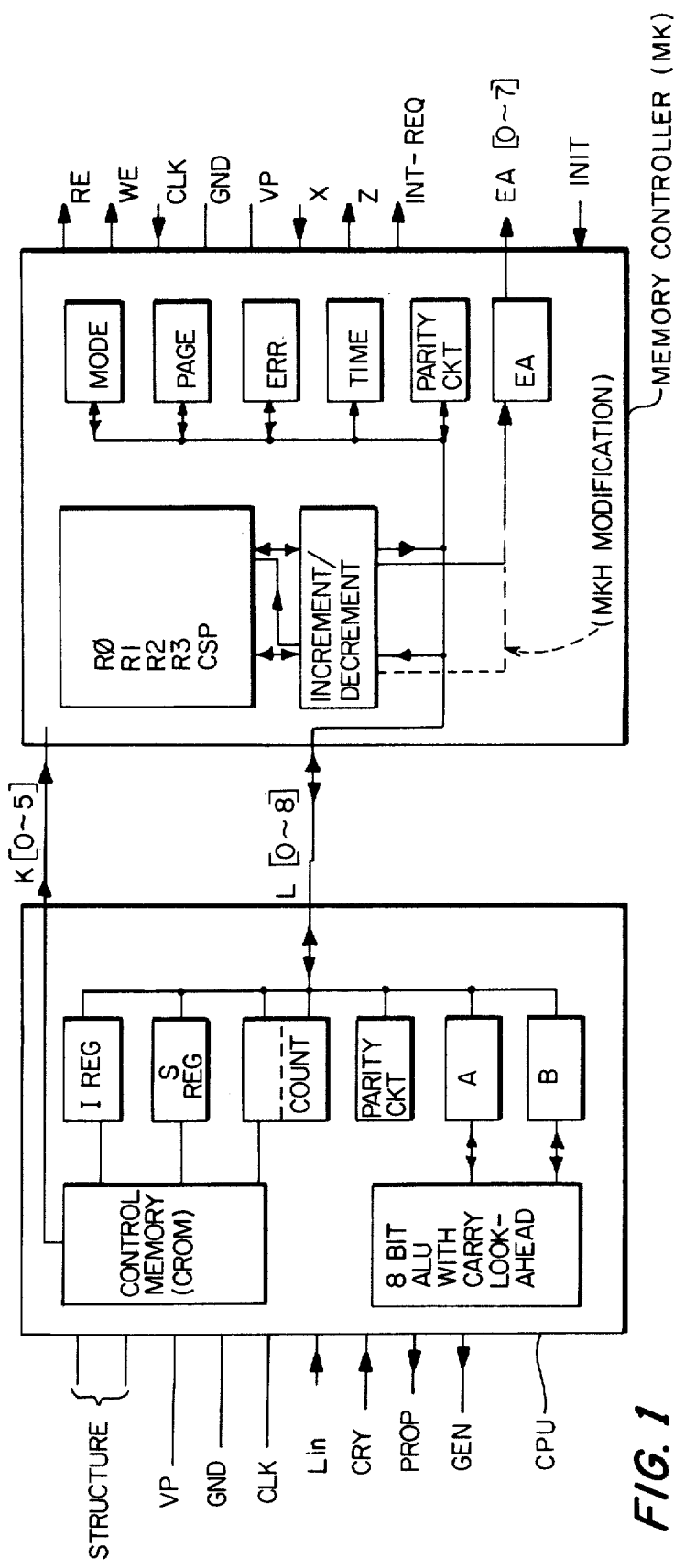
FIG. 1 is a block diagram of the basic architectural design of the preferred embodiment.

The present architectural design will be discussed in general with reference to the block diagram of FIG. 1, and more in detail, in connection with the remaining figures. The microcomputer is a multiprecision stack oriented processor with privileged/user modes and virtual or non-virtual memory. The microcomputer architecturally divides the CPU and the memory and provides a memory controller as part of the memory. Each of the memory controllers are identical and provide the capability for manipulation of the stack in the memory module.

The architecture is developed to remove a set of registers from the CPU and place them in each memory controller. This reduces the amount of time the CPU is used for data retrieval and general memory management. It also reduces the amount of data transmitted between memory CPU. The architecture has three basic blocks; the CPU, the memory controller MK and memory.

The CPU includes a control memory (CROM), an instruction register (IREG), a status register (SREG), a count register (Count), parity circuit, an arithmetic logic unit (ALU) and registers A and B. The CROM contains the microroutines needed to execute programs or run the computer. The IREG contains the CROM address of the first microstep of the next microroutine to be executed from the CROM. The microstep includes microorders for the CPU and the memory controller. The status register SREG contains the eight-bit status vector, C, Z, N, V, M, I, P, U, which are:

C is carry,
Z is zero,
N is negative,
V is an overflow stat after arithmetic operations or the parity stat after push or logic operations,
M is mid-carry,
I is interrupt enable,
P is the parity check enable,
U is the user identification stat.

The user identification stat U is 1 for the general user and is 0 for the privileged user (which is generally the internal program for management). The count register is a sixteen bit counter for controlling a looping operation. The number of times a loop is to be performed is loaded into the count register and then decremented as the loops are performed. The parity circuit is a standard unit which checks and reports on the parity of data transmitted and received by the CPU, as well as adding the proper parity bit for transmission.

The arithmetic logic unit (ALU) is also a substantially standard unit having a carry and look-ahead capability. Registers A and B are associated with and used by the ALU as storage or buffer registers.

The CPU has two structure inputs which are used in an "n-CPU" configuration to be discussed later. Also connected to the CPU are the standard power supply voltage ($V_p$), a ground (GND), and a clock input (CLK). The four remaining CPU control terminals are left input (LIN), carry (CRY), propagate (PROP) and generate (GEN).

The CPU communicates with the memory via two busses or links, i.e. K and L. Memory controller microorders are transmitted from the CPU over six parallel links represented by link K and data is transmitted between the CPU and memory controller over nine parallel links represented by link L. The link L is eight bits of data with the ninth bit being the parity of the data. It should be noted that memory addresses are sixteen bits long and thus the transmission of a full address requires two separate transmissions over data link L. The six bit memory controller microorders transmitted over link K generally include three sets of information, each set using two bits. These sets are, beginning with the higher order bit pairs, the class, the mode and the register. The class defines the act to be performed, the mode is the movement of a primary controller pointer, and the register is the pointer whose contents defines the destination of the data on the L link. The sets are shown in Table I.

TABLE I

| Class | 00 | read, increment/decrement after addressing |
|---|---|---|
| | 01 | write, increment/decrement after addressing |
| | 11 | write, increment/decrement before addressing |
| Mode | 00 | no increment |
| | 01 | increment |
| | 10 | decrement |
| Reg | 00 | Pointer register R0 |
| | 01 | Pointer register R1 |
| | 10 | Pointer register R2 |
| | 11 | Pointer register R3 |

For example, the microorder 000101 would cause the memory controller to read the word pointed to by pointer register R1 and increment the pointer R1 after addressing.

Other microorders for operating the memory controllers use the remaining numerical combinations of six bits as well as special definitions of the code in Table I. An example of the latter case would exist for the program counter R0. Since it points to the next instruction, the write microorders do not operate for pointer R0. This prevents the destruction of the internal program and thus provides one form of overwrite protection. Thus the five microorders 010000, 010100, 011000, 110100 and 111000 may be used for other memory controller functions without creating a conflict.

The basic memory controller MK, seen in FIG. 1, is a single integrated circuit chip either separate from or on the same chip as a memory segment. The basic memory controllers may be interconnected to provide either virtual or conventional memory configurations.

The memory controllers include five 16 bit pointer registers (R0, R1, R2, R3 and CSP), an increment/decrement circuit, an eight bit mode vector register (MODE), an eight bit page address register (PAGE), a nine bit error register (ERR), an 11 bit page timer register (TIME), a parity circuit, and an eight bit effective address register (EA). Though including additional circuitry, the above-mentioned circuits are the major functional blocks which are to be described to understood the operation of the present architectural design. As described above, the memory controller communicates with the CPU over microorder link K and data link L. The memory controller communicates with its segment of memory or page of memory with a read enable output (RE), a write enable output (WE) and an eight bit effective address (EA).

Other than the standard inputs of clock (CLK), ground (GND) and power supply ($V_p$), the memory controller has an X input from a higher adjacent memory controller and an output Z to a lower adjacent memory controller. These two terminals will be explained in detail in connection with the overall configuration of the memory and memory controllers. The memory controller has also an interrupt request (INTREQ) output.

Very briefly, the conventional memory organizations use two controllers, MKH and MKL. The controller MKL produces the least significant eight bits of the effective address on its output EA, and MKH produces the most significant eight bits of the effective address on its output EA, and the read enable and write enable signals for all of the memory. MKL is the same chip as is used for the virtual memory organization and MKH differs from MKL only in the metallization pattern (as shown by the dotted line in FIG. 1). We will discuss the connection of these two modules for conventional memory later.

For virtual memory organizations, one controller MKL is used with each page 256 words) of memory. The registers MODE, TIME, PAGE and ERR are used to control access to the page.

The MODE register contains the eight bit mode vector or stats E0, E1, E2, E3, P, W, F, I, which are:
 E0: read/write enable for R0
 E1: read/write enable for R1
 E2: read/write enable for R2
 E3: read/write enable for R3
 P: read/write enable for privileged modes
 W: write enable for the chip
 F: write flag
 I: parity or stack error.

If E0 is 1, then R0 can read or write on this page (it is in the binder for R0). Similarly, R1, R2, R3 are governed by E, E2, E3. P indicates a privileged mode page. If mode stat P is 1 (privileged mode) and U of the CPU state vector is 1 (user's mode), the CPU is unable to read or write in this page; but, while in the privileged mode (U of the CPU stat vector is 0), it is able to do so. If W is 1, the chip is write enabled. These are the enable bits. Two more bits in MODE are flag bits sent by the memory controller. In an MKL write flag, F is set to 1 if a write has been made on that page. This tells the operating system whether or not the page must be put back into secondary memory if a new page is brought in to replace it. In an MKH chip, F is used to inhibit the interrupt caused when an operational stack boundary is met. Mode stat I is set to 1 if the memory controller finds an error in incoming parity or a stack check.

The page timer TIME is the high order eight bits of an eleven bit counter used to support virtual memory operations. This counter is cleared when a word is read from or written into a page, otherwise, it is incremented. Logic is provided for preventing TIME from recycling back to zero when it has reached its maximum count. So TIME indicates the number of read/write operations that have occurred in memory since the chip was last used in read/write operation divided by eight. TIME and F are used by the memory manager software to determine which page is to be taken and sent back to secondary memory when a new page is brought in to real memory.

The page register PAGE contains the high order or leftmost eight bits of a 16 bit address, while the rightmost eight bits identify the word on the page and is called the effective address (EA). Each page will be considered to be 2056 eight bit words. It can be put on a physical memory chip in "real memory", in which case we way it is active or on a secondary memory such as a floppy disc, extended core memory or bulk shift register such as CCD, in which case we say it is passive. The number of active pages is fixed by the number of memory chips in the processor. Activation of pages is done on demand by a supervisory control program called the memory manager when an address on that page is presented. This, of course, is the same principle as is used in cache memories and other virtual memory schemes.

The number of the page is determined in an initial program load (IPL) routine. If a required page is not found in active memory (by comparison of the contents of the page register and the leftmost eight bits of the desired address), a page fault is executed to interrupt the program. A subroutine is executed to bring in the missing page. As stated above, the page timer TIME is used for determining which page should be replaced if there is no vacant page.

For the chip that has a combined memory controller and memory, a register ERR will be available. It will keep account of the column parity. (The row parity will be kept in the ninth bit of each word.) ERR is loaded as follows: every time a word is written into location n of a chip, that word, the word that was in location n, and the old value of ERR, are exclusive-OR and loaded into ERR. Thus, it contains the exclusive-OR of what all the bits in each column should be. SO if a parity error in a row is detected upon reading it, a TRAP is executed. The column parity of all the words on the page is computed by the trap handler, and this is compared with ERR. If a given bit is bad, the row it is in and the column it is in will have the wrong parity. These coordinates could be found by the scheme above, which is explained fully in the Flynn article. The bit can be corrected and processing can be resumed. Since the memory controller has to have access to the memory chip to accomplish this technique, it is not available where the memory controller is separate from the memory chip.

Each memory controller MK has five sixteen bit pointer registers:

R0: program counter,
R1: operational stack pointer,
R2: list or auxiliary operational stack pointers,
R3: list pointer
CSP: control stack pointer The program counter R0 only points to the next instruction stored in memory. Operational stack pointer R1 is reserved to point to the top of the operational stack, which is kept entirely in active memory. R2 is used as an auxiliary operational stack pointer for multiprecision operation. R2 and R3 are list pointers which can be used to read or write data. Pointer CSP points to a control stack for keeping subroutine return address and other control data. Each memory controller includes all five pointers and the contents of the pointers are the same on all memory controller chips. The pointers are used in conjunction with the page register to locate addresses in memory. Since the searching (by register comparison) is executed in the memory controller, there is less data transmitted to and from the CPU and requires less time for control from the CPU.

Included on each memory controller is a half adder which increments or decrements the pointers. This allows for a series of memory controller operations to be performed with the transmission of one complete sixteen bit address and a plurality of six bit memory controller microorders MK.K. Thus, the time and amount of data transmitted between the CPU and memory is further reduced.

A stack in the microcomputer is a string of words in memory. There are two important stacks, the control stack and the operational stack. The control stack is used to save return addresses and so on (for example, mode vectors). The operational stack is a string of words in the remainder of active memory. The operational stack is useful for buffering data and for arithmetic and logical operations on data. Under normal operations, R1 points to the lowest addressed word on the top of the stack. However, it is possible for R1 to point to any location in memory that is bound for that register. We will discuss the move instructions and arithmetic instructions in terms of the operations PUSH and POP, which add a new word to the lowest addressed end of the operational stack, or take the lowest addressed word from the operational stack, respectively. However, the hardware will execute the same procedure relative to R1 even though R1 may not be at the lowest addressed word on the operational stack.

The interrelationship of the pointers and the two stacks will become clear in the description of machine operations to be described in detail below.

The parity circuit is a standard circuit which checks the parity of the nine bit word coming in on the data link L and also provides the ninth or parity bit for a word to be transmitted out on the data link L.

CPU

Before describing in detail the CPU, two circuits external to the CPU chip and their operation will be described.

POWER UP

Figure 2:
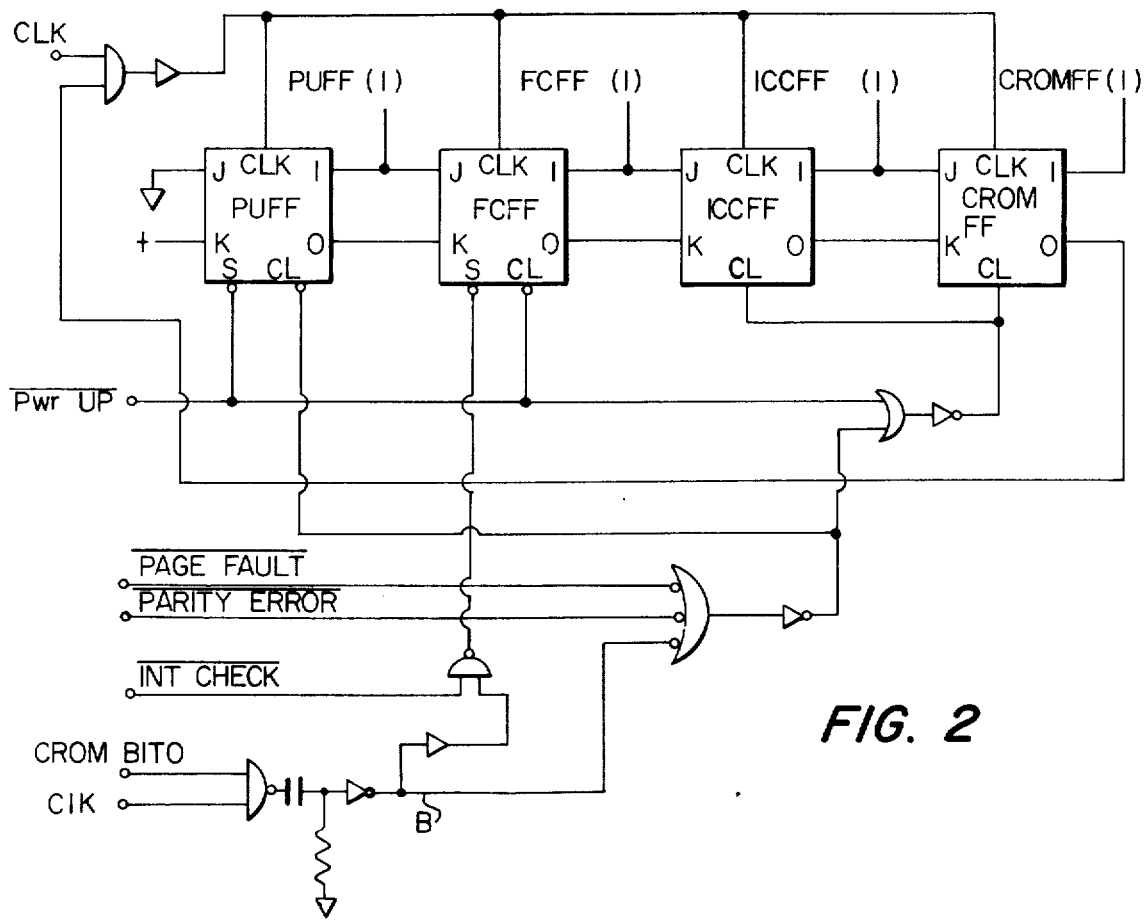
FIG. 2 is a schematic of the Power Up Routine circuitry.

Within the CPU chip is a power up routine circuitry, illustrated in FIG. 2, whose function is to clear all necessary registers and initiate the first instruction fetch. The subsequent actions taken by the Micro Processor are also initiated by this circuitry.

The initialization of the Micro Processor is concurrent with the application of all DC voltages at their proper levels. A power up circuitry, also external to the CPU chip, senses all supply voltages, develops the Power Up Pulse (PWR UP) and provides the following actions:

1. Sets Power Up Flip Flop (PUFF)
2. Clears Fetch Code Flip Flop (FCFF)
3. Clears Interrupt Check Code (ICCFF)
4. Clears CROM Gate Flip Flop (CROM Gate FF).

The power up routine circuit develops a delay between the Power Up Pulse and the beginning of the Clock signal to the CPU. It also causes the Clock (CLK) signal to always start on the positive going leading edge and run continuous from there. The Clock is gated on to the Clock inputs on all four flip flops by the signal CROM Gate FF (o) which is in the one state due to the clearing action by the Power Up Pulse. The first positive going edge of the Clock loads J=0 and K=1 into the Master of the PUFF, and the following negative going edge of the Clock transfers the Master to the Slave subsequently resulting in the output changing to a zero. Thus, the one that was set into the PUFF (1) remains until the first negative going edge of the clock. The four flip flops are connected to form a shift register so that the preset one input gets shifted through all four stages by the appropriate signals. The shifting out of the PUFF and into and out of the FCFF and ICCFF and then subsequently into the CROM Gate FF is done on contiguous clock pulses in a manner as described for the PUFF. The final clearing of the CROM Gate FF is the result of one of three possible conditions as follows:

1. The end of a microroutine
2. A page fault
3. A parity error.

The end of a microroutine is initiated by bit 0=1 of the last microstep out of the CROM. This signal is 'Anded' with the Clock and the resulting signal generates pulse 'B' on the negative going edge of the Clock. This pulse clears the CROM Gate FF and concurrently sets FCFF. This action terminates a microroutine after the last microstep and at the same time starts the Fetch Code cycle for the next microroutine. A different action is performed by both Page Fault and Parity Error inputs. In a manner similar to the termination of a microroutine, either of these two conditions clears the CROM Gate FF. However, they do not set the FCFF; thus, a new fetch is not initiated. In place of the fetch, an appropriate trap routine is initiated for each condition by clearing the ICCFF.

INTERRUPT LOGIC

Figure 3:
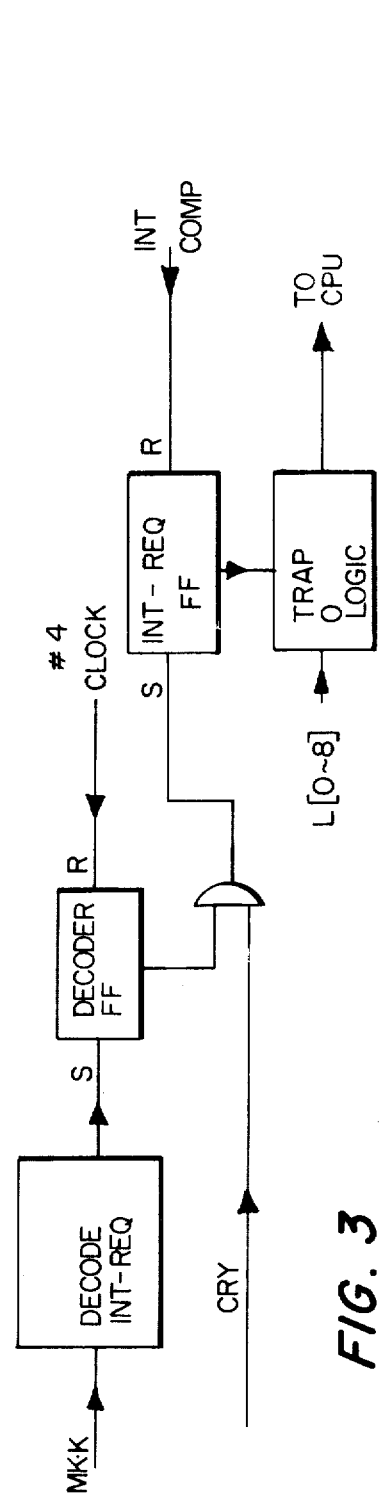
FIG. 3 is a schematic of the Interrupt Request Logic.

Another circuit separate from the CPU chip is the Interrupt Logic of FIG. 3. In the second cycle of any instruction execution, control buss K has a code MK.K for an interrupt request check. The sequencing of a normal set of cycles without an interrupt is:

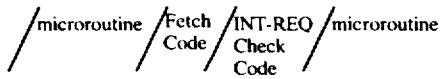

This microorder is decoded by the Interrupt Request Decoder which sets the Decoder Flip Flop. At the same time, the input CRY to the CPU is loaded through an "AND" gate to the Interrupt Request Flip Flop, INT-REQFF. When it is 1 and 1, the interrupt enable bit 1 of the status vector is 1, after the end of an instruction cycle, an interrupt cycle is entered. The first cycle puts 0 on GEN and a microorder MK.K to read the word pointed to by CSP register on buss K and the second cycle puts 000000000 on L. At this time, one cycle after MK.K is read CSP and GEN is 0, an eight bit number $n$, which must be even, can be ORed into the L buss. If A is ORed into the L buss, a trap instruction is executed, picking up from a special page H the lower half address of the first trap instruction, at location $n +$ 1. If no address is ORed into the buss L, a TRAP 0 is executed. These operations are performed by the Trap 0 Logic. The operation systems will be written to begin poling the input/output (I/O) devices to determine which one requested an interrupt if a TRAP 0 is executed. The Decoder Flip Flop is reset by the clock and INT-REQff is reset by an Interrupt Complete Signal from the CPU.

These and other traps and interrupts will be discussed in detail after the detailed description of the memory control and the priority rail.

CPU

A more detailed diagram of the CPU, which is fabricated on a single chip, is shown in FIGS. 4A, B and C. The CPU consists of a CPU Control Circuit, Arithmetic Logic Unit, and Status Vector, Count Reg. and Parity.

A. CPU CONTROL CIRCUIT

The Instruction Register (IREG) consists of eight latches that may be loaded in a fetch operation or cleared by either a Trap or an I/O Interrupt condition. The Trap clears the five most significant bits while the three low order bits are loaded, simultaneously, from the Trap Matrix. In contrast, the I/O Interrupt condition clears all eight latches in the I Reg.

The eight outputs from the I Reg. with the 'OR'ed Trap Matrix bits are used to provide a microroutine entry address in the control memory CROM. The sequencing of the microsteps within each microroutine is effected by the 16 state clock which includes a four bit counter that also provides inputs to CROM. This counter is cleared by the Interrupt Check Code Flip Flop (ICCFF) pulse, that occurs simultaneously with loading of the I Reg. from data buss L. The clock that increments the counter is obtained by gating the main clock with the Control Memory Flip Flop (CROM FF (1)) output. As the counter is counted in the up directions, each coded microstep of a microroutine appears at the CROM output. This process is continued until the most significant bit of the microstep becomes a 1 (for all previous microsteps within a microroutine had been 0). On the next clock pulse, the CROM FF (1) signal becomes 0. This action gates off the count clock, thus terminating the microstepping within the particular microroutine.

The operation of the I Reg. and its controls follows the end of the previous microroutine, wherein the next Fetch cycle is started. The Fetch cycle is represented by the output of the Fetch Code Flip Flop (FFCFF) (1). The corresponding code out of the CROM that is sent to the Memory Controller tells the Memory Controller to read the contents of R0 (the program counter). The high order byte (eight bits) of the resulting word is used to test for a page comparison, and the low order byte is used as the Effective Address (word address) if the page comparison was successful. The Effective Address then selects the corresponding word in real memory for reading and, as a result, this word is transferred to the CPU via the Link L [0 ~ 7]. The word on the Link L is entered into the I Reg. by the ICCFF (1) and Clock signals. Next the CROM FF (1) and Clock signals provide the count clock for incrementing the counter that sequences the microsteps. This counting will be terminated by a microstep containing a 1 as the most significant bit out of the CROM as previously described.

The transmission of the contents of the I Reg. to the data buss L is through output gates which are controlled by a CPU microorder (CPU.K) decoder.

The output of the control memory CROM is an 11 bit microstep including an end of microroutine bit, a four bit CPU microorder CPU.K and a six bit memory controller microorder MK.K. The whole microstep is put into the microorder multiplexer K.MUX. Another output from the memory control CROM is to the special microorder decoder. The special microsteps from the CROM are decoded and used to address microorders in Microorder Memory MOM. The MOM provides at its output a six bit microorder to the K.MUX. In addition to the Back Up Logic microorders (BU.K), MOM provides the Power Up No-op, Fetch and INT-REQ check codes. The Back Up Logic provides a hardware means for returning the machine to a pre-no fault condition after certain machine faults have been detected internally. Three types of faults may invoke the back up procedure and these are listed as follows:

1. CPU Parity Error
2. Direct Address Error
3. Register Fault.

During the execution of an instruction, one of the above listed faults may occur. In that event, the normal execution sequence is interrupted and all memory pointers are returned to the same state that existed before the fetch instruction for the particular sequence. Following a back up procedure, the failing sequence may be retried successively until a pass is obtained or until a limited number of unsuccessful tries abort the run. This option is under software control.

The manner in which the Back Up Logic performs this capability is based on keeping a record of the number of times that each pointer register in a designated memory controller is either incremented or decremented from its value before the routine containing the fault occurred. Thus, for the five pointer registers in an active memory controller, five corresponding up/down sequence counters are provided with the Back Up Logic. The length of each counter is sufficient to count to the highest number of increments or decrements within all instructions without overflow plus an additional stage providing sign or increment/decrement information. Thus, if R0 for instance, had been decremented one time before a fault occurred, the counter output would read 11. This number is the 2's complement representation for −1, thus corresponding to an R0 count change of one in a negative or decremented direction.

In addition, a totalizing count is also held in each counter. As an example of this, suppose R1 had been incremented twice and decremented once before a fault occurred. The resulting totalized count of 001 would be the final result of the count sequence. In order to correct the R1 pointer to its original condition, it is first necessary to examine the most significant bit. Since it is 0, there was a net positive change in the pointers position prior to the fault and the two least significant bits give the amount of change. Thus, the restoration of R1 requires decrementation by one count. This correction is automatically provided by the Back Up Logic hardware.

The correspondence between a change in a pointer register and a change in a counter is effected by a common control signal MK.K, which is sent from the CPU to the memory controller. Thus, when the control signal MK.K tells a certain pointer register to either increment or decrement, it also gives a similar command to the corresponding counter in the CPU. The Back Up Logic accepts the MK.K and from it generates five pairs of control signals, each pair corresponding to a particular counter. Within each pair are contained clocked signals for either incrementing or decrementing the counters. A single counter increment or decrement is performed synchronously on the master clock signal and thus requires one clock internal corresponding to a microstep cycle. Two count charges would require two clock intervals and etc., which is the same manner in which pointer registers are changed. As a result of the above action, the counters are activated from the beginning of a fetch cycle until a fault occurs. If a fault does not occur and the microroutine is successfully completed, the up/down counters in the CPU are cleared. A power up pulse produced when the machine is first turned on will also clear the counters.

If a fault has been detected, the Back Up Logic initiates the following procedure. First, the R0 counter is read by the Back Up Logic. If other than zero, the Back Up Logic sends a signal to the MOM decoder to provide appropriate microorders BU.K to count both the R0 counter and the corresponding pointer R0 in the proper direction to put the counter at zero and pointer R0 to its original state. Once this has been accomplished, the hardware performs the same function to the R1 counter and the stack pointer register R1, as a pair. Upon correction of this pair, the following counter-register pairs are sequentially corrected in a similar manner. After all parts have been completed, the Back Up Logic produces an "end of back up sequence" signal that informs the software that the hardware is now ready to repeat the previously faulted routine or be guided to some other action.

Figure 5:
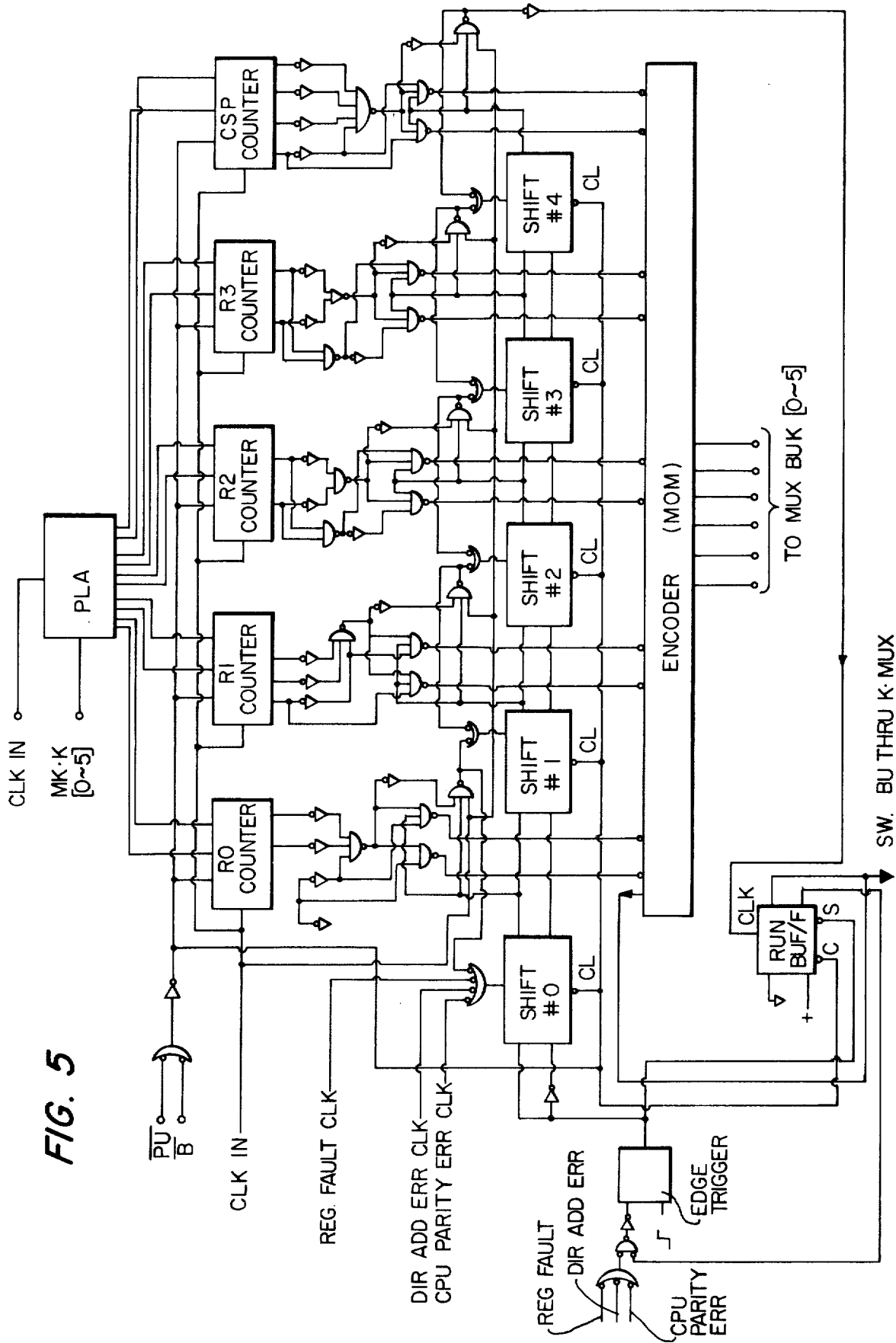
FIG. 5 is a schematic of the Back Up Logic circuitry.

The decoding of the control signal MK.K [0 ~5] and the subsequent encoding into counter control signals for the Back Up Logic is effected by an eleven term PLA (Program Logic Array) as shown in FIG. 5. The main clock signal is also input to the PLA so that the output control signals are appropriately clocked. Five up/down counters ($R_0$ - $R_3$, CSP) are driven by the PLA and these counters are cleared by one of two sources. After the machine is first turned on, power up ($\overline{PU}$) pulse does an initializing clear. Subsequently, the counters are cleared by a pulse ($\overline{B}$) that is generated at the end of every microinstruction sequence which is successful, meaning it was not prematurely terminated by a fault condition.

A five stage shift register is used as a sequence pointer that determines the sequential order of correcting counter-register pairs. Upon detection of a fault, the first stage (Shift No. 0) of the shift register is loaded with a one, while all other stages hold a zero, having previously been cleared in a manner similar to the clearing of the counters. The one output of the Shift No. 0 stage enables a block of gate logic that accepts the sign bit and count bits from the $R_0$ and generates one of two possible output signals for driving an encoder. The encoder, which is a section of the MOM, generates the appropriate correcting K [0~5] which is then fed to the pointer registers and also back to the Back Up Logic PLA. One of the two activating signals from the gate logic to the encoder requests that a corresponding K [0~5] out of the encoder provides a counter-register pair do a decrement while a second signal requests an increment of the pair. Since only a single increment/decrement may be performed for each clock cycle, one or more clock cycles may be required to complete the operation on a counter-register pair. Once the operation is complete, all the inputs to the encoder are at the one level. A single decoder, located within the encoder block decodes the one state and results in a BU Noop output code. This BU Noop code does not effect $R_0$ and page register initialization, as does the Power Up Noop. Its purpose is to stop all other operations for one clock interval while the shift register is shifting between stages. The shifting action uses a single clock pulse, resulting in a synchronous shift. Thus, at the end of every pair correction count, a BU Noop takes place. If any counter-register pair is already correct when its turn for correction comes up, the BU Noop is executed immediately following the BU Noop from the preceding correction step and the operation shifts to the next succeeding step.

The shift of the one out of the last shift register stage (Shift No. 4) is concurrent with clearing of the Run Back Up FF (Run BUFF) and signals the end of the back up routine. The resulting RUN BUFF, output having been set when the one was set into the shift register's first stage and being cleared at the end of the back up sequence, provides a gate for putting the above described control K [0 5] on the K bus. This gate signal switches the control K onto the K bus by means of the K multiplexer.

Figure 4C:
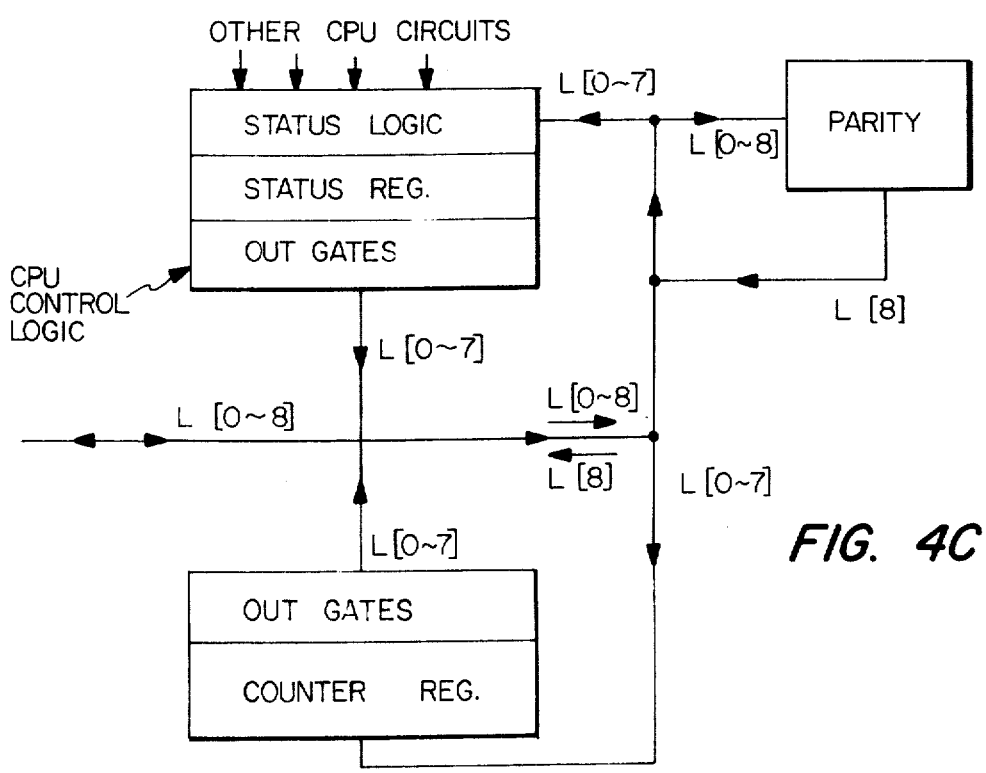
FIG. 4A, B and C are expanded diagrams of the Central Processing Unit.
Figure 4B:
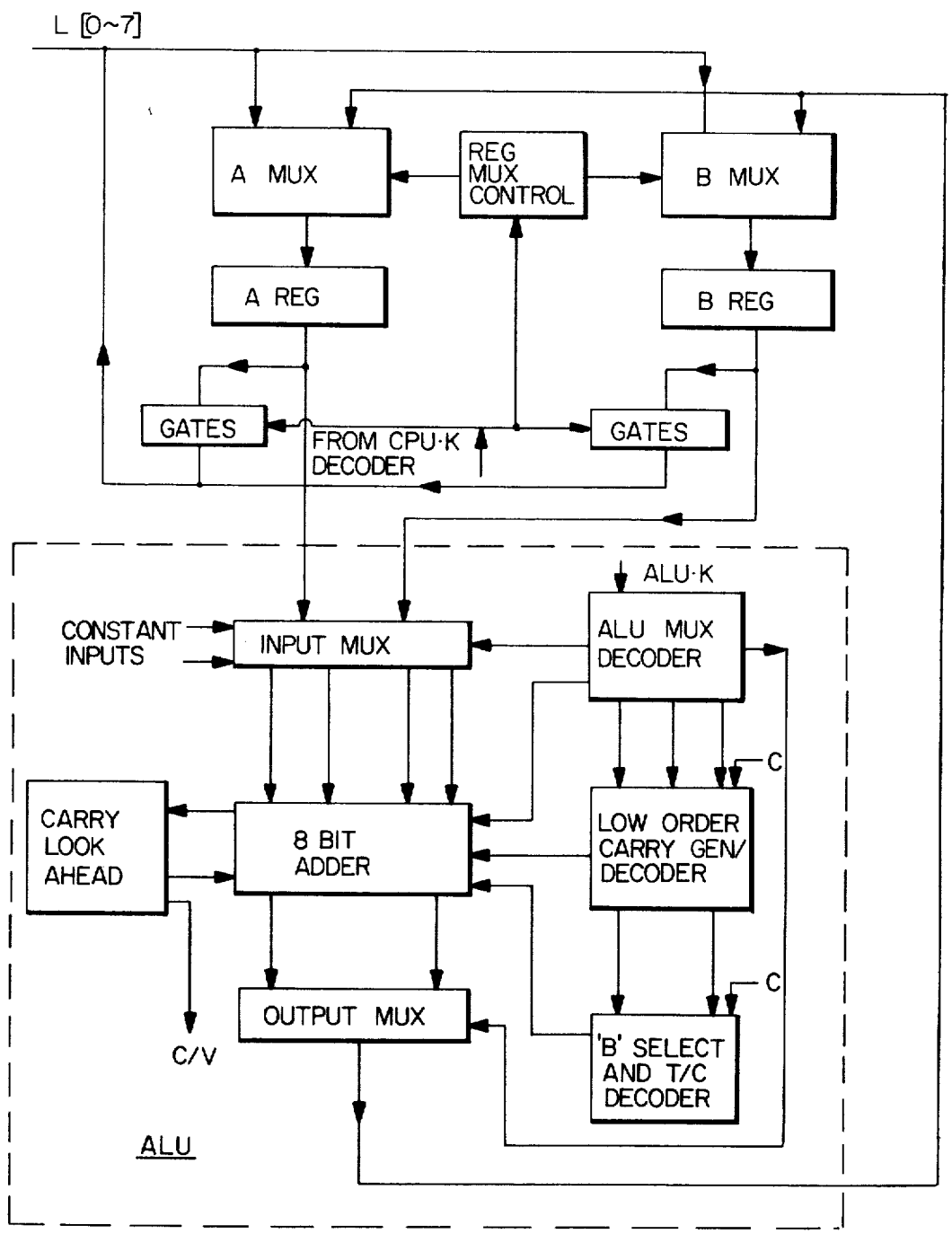

A control signal multiplexer K.MUX is provided to select and produce the 11 bits required for the CPU.X and MK.K microorders used in the CPU and transmitted or placed on the control buss K and a five bit ALU.K microorder for the ALU of FIG. 4B. The multiplexer K.MUX receives four bits from the instruction register I Reg, six bits from the special microorder memory MOM, and eleven bits from the control memory CROM. The CPU.K decoder provides the control signals required by the multiplexer K.MUX.

A delay cycle register is provided to store the six bit control signal MK.K and make it available one clock cycle later for those functions in the CPU that require a delayed and overlapped control. The register consists of a set of six master-slave flip flops. The control signal MK.K is loaded into the master on the positive going edge of the clock signal and appears at the slave output terminals on the negative edge of the clock.

B. ARITHMETIC LOGIC UNIT

The Arithmetic Logic Unit is connected to the data buss L by two eight bit buffer registers A Reg and B Reg. The inputs to the two registers A Reg and B Reg are determined by two multiplexers, A Mux and B Mux, respectively. Each multiplexer A Mux, B Mux has one input connected to the data buss L and another input connected to the output of the ALU. A multiplexer control, which receives commands from the CPU.K decoder of FIG. 4A, determines which input to A Mux and B Mux is to be passed on to their respective registers A Reg and B Reg. The outputs of A Reg and B Reg are connected directly to the ALU and to the data buss L through gates which are under the control of the CPU.K decoder.

The ALU in the microprocessor performs all of the arithmetic and logic functions within the CPU. Other arithmetic type operations that are not directly associated with the ALU operation in the CPU, such as increment and decrement, are performed in the memory controller. There are 32 separate arithmetic and logical functions performed by the ALU and these are identified by a five bit code made up of four bits taken from the instruction register combined with a single bit from the main CROM output. These functions may be categorized as monadic single precision, monadic partial multiprecision, dyadic single precision, dyadic partial multiprecision, right and left shifts and correct excess three decimal arithmetic.

The ALU consists of a basic eight bit adder combined with both input and output multiplexers, B select and control for true or complement input, MUX control, a low order carry generate circuit, and a full carry look-ahead circuit. The block diagram of the ALU, which is encompassed by the dotted lines in FIG. 4B, shows the overall arrangement of the functional sub-blocks. The input operands A and B, from registers A Reg and B Reg respectively, as well as required constants are selected in the input MUX for presentation to the eight bit Adder. An input constant of '0' is required for certain Monadic Shift operations, while an input code of '0011' corresponding to binary three is introduced on each pair of four bit groups of the Adder for Decimal operations. The eight bit Adder consists of eight identical logic sections where each section produces a sum as a result of the A, B and carry inputs. In addition, each stage produces, as an intermediate operation, the AND, OR and XOR (exclusive OR) functions of input variables. Also included in each logic section is a pair of gates, one of which selects the B input while the other passes the true or complemented value of either the A or B input.

Associated with the Adder is a full carry look ahead circuit whose purpose is to speed up ALU operation by circumventing carry propagation and also updates the carry stat C and the overflow stat V of the CPU status vectors. The output MUX selects outputs from each adder stage appropriate to the operation being performed. The low order carry input to the adder depends on the selected operation and therefore is generated as a function of the ALU control signal and the carry stat C of the CPU status vector by the Low Order Carry Generate circuit. The 'B' select gate controls transmission of the B input to the adder while the True/Complement decoder circuit controls the True/Complement gate in the Adder circuit, also as a function of the ALU control signal and the carry stat C of the CPU status vector. The switch positions of both the input and output MUXs are controlled by the ALU MUX decoder circuit. Thus, the complete control for the ALU consists of the ALU MUX decoder, the low Order Carry Generate decoder, the 'B' select, and the True/Complement decoder. It is this complete control group that receives the ALU.K code, thereby providing the desired ALU operation.

The logic diagram of one of the eight identical basic adder circuit and its input control gates is shown in FIG. 6. the true/complement (T/C) function on the A input is provided by an exclusive OR gate controlled by the T/C In line which extends to all adder stages. The B select gate accepts the 'B' select input and determines when the B input will be gated into the adder. Similar to the T/C control line, the 'B' select line extends to all adder stages. The actual adder circuit begins with the logic within the dotted lines. This circuit is, in effect, an exclusive OR gate (Z2 output), whose intermediate taps also yield AND (Z1) and OR (Z4) functions of the input variables. A second exclusive OR gate follows the first exclusive OR gate and combines the carry input (CRY IN) with the sum term $Z_2$ out of the first OR gate. The resulting output (Z3) of the second exclusive OR gate is the final sum term made up of the two input variables and also the carry input.

In a general sequence of arithmetic operations, two words are loaded into A Reg and B Reg, through the A Mux and B Mux, respectively. The contents of A Reg and B Reg are manipulated in the ALU under the control of the ALU Control. The results are sent to the appropriate Register (either A Reg or B Reg) and then transmitted to the data buss L through the appropriate gate.

C. STATUS VECTOR, COUNT REG. AND PARITY

The remaining elements of the CPU illustrated in FIG. 4C are the Status Vector Logic and Register, the Count Register and the Parity Circuit. Each of these circuits are connected to the data buss L.

The Status Register contains the eight bit status vector C, Z, N, V, M, I, P, U, as explained earlier. The Status Logic controls the individual bits of the vector in response to other circuits in the CPU, for example, the Carry Look-Ahead circuitry of the ALU. Output gates under the control of the CPU control logic are provided to place the status vector onto buss L.

The Count Register is a sixteen bit counter for controlling a looping operation. The number of times a loop is to be performed is loaded into the counter register via the data buss L. The counter is then decremented as the looping operation is performed. The contents of the Count Register is compared by hardware connected directly to that register for a count of one. Once the Count Register counter reaches a one count at the end instruction in such a loop, the loop is not re-executed and the next instruction is read, using a fetch cycle. The looping and nesting operations will be more fully described below.

The Parity Circuit is a standard parity circuit which receives the nine bit word from buss L and checks the parity thereof. If there is a parity error in the received signal, it transmits a signal to the status logic which, in turn, changes the parity stat P to indicate a parity error. The parity circuit also receives an eight bit signal from buss L and provides the ninth or parity bit suitable for transmission onto the data link or buss L when the CPU transmits a signal.

MEMORY CONTROLLER

Memory control is exercised by microorders MK.K that enter the memory controller MK via K[0 ~ 5] from the control CROM in the CPU. These microorders can cause an eight bit register, or the left or right half of a sixteen bit register, to be read from or written into from the data link L [0 ~ 8], or they can cause an address EA [0 ~ 7] to be derived from one of the registers R0, R1, R2, R3 or CSP, and a read or write enable, RE or WE to be sent to the memory segment controlled by this memory controller. At the same time, an address is calculated from a register, the contents of the register can be incremented or decremented. Either the old contents of the register or the incremented/decremented contents of the register can be used as the effective address. Before describing the detailed circuit diagram of the memory controller as illustrated in FIGS. 24A–D, the memory controller microorders MK.K will be described with the necessary decoders.

The present computer operates as a "pipeline" machine and, therefore, has several operations going on simultaneously. For both the CPU and Memory Controller, these operations occur in time intervals termed the Precycle, Priority Cycle and Main Cycle. Table II shows the timing for several consecutive microorders and their respective time slots.

The current microorder that is received from the CROM in the CPU is maintained during the precycle interval by the storage and mapping capability of the Instruction Register, the CROM sequencer, and the CROM in combination. Thus, these microorders are sequentially presented to the control circuits of both the CPU and the Memory Controllers. The Priority Cycle for each and every precycle interval starts one-half interval after its particular precycle. Subsequently, the main cycle associated with each precycle starts one-half interval after the beginning of the priority cycle or one complete interval after its precycle. In this mode of operation, three separate time interval operations may be performed on each microorder, even though all micro-orders are made available in singular consecutive time intervals.

also be selected to the proper position. The low order byte out of the byte multiplexer is passed through the EA (effective address) multiplexer and then the EA register is enabled to receive the byte. Actually, all of the above operations occur during the first half of the precycle and are completed before the next contiguous precycle begins. During the last half of the precycle interval, the slave register is gated onto the 16 bit internal bus and the resulting data on the bus is gated back into register $R_0$.

Since a single 16 bit bi-directional buss must suffice for all pointer register operations, the buss will only be allocated to operations occurring in the precycle interval. Thus, consecutive precycle interval operations may occur without interference on the buss.

The various microorders that control the Memory Controller must be active during both the precycle and main cycle intervals. During the precycle interval, the particular microorder that is available on the K buss is decoded into the required control signals. These signals may then represent individual microorders or they may represent appropriate groupings of microorders as required for control. During the main cycle, the microorders required for control are decoded from microorders that were stored previously in holding registers during the precycle interval. These delayed microorders are made available to the main cycle decoders in the main cycle interval. Similar to the decoding that takes place during the precycle, the main cycle decoding also represents both discrete and functionally grouped microorders.

MEMORY MICROORDERS

The microorders MK.K for the Memory Controller will be discussed hereafter in functional groupings. The following grouping of microorders control real memory accesses using the four pointer registers $R_0$, $R_1$, $R_2$ and $R_3$ and also the control stack pointer register CSP.

TABLE II:

TIMING DIAGRAM FOR SEVERAL CONSECUTIVE MICROORDERS

| | SET Z Microorder | SET EA Microorder | ABREAD Microorder |
|---|---|---|---|
| Precycle | Precycle Operations | Precycle Operations | Precycle Operations |
| Priority Cycle | Previous Microorder | Priority Rail Used to Select Page for SET Z | Priority Rail Used to Select Page for EA | Priority Rail Selects Page |
| Main Cycle | Previous Microorder Main Cycle Operations | SET Z Microorder Main Cycle Operations | SET EA Microorder Main Cycle Operations |

As an example, consider the SETZ memory controller microorder shown in Table II. The operations performed during the precycle interval consist of gating the pointer register $R_0$ onto the internal 16 bit bus to the byte multiplexer. Concurrently, the byte multiplexer is selection controlled to pass the two bytes (16 bits) in their normal byte configuration (not transposed) to the incrementer/decrementer and also to the page comparator. The incrementer/decrementer is also controlled to do an increment operation. The slave register following the incrementer/decrementer is enabled to accept the resulting two byte word. Meanwhile, the result of the page comparison is available to the Z flip fop via the comparator switch, which must

| Microorder Mnemonic | Microorder Code; K [0~5] | | |
|---|---|---|---|
| RD= | 0000XX | XX = 00 | for Register R0 |
| RD+ | 0001XX | 01 | R1 |
| RD− | 0010XX | 10 | R2 |
| WT= | 0100XX | 11 | R3 |
| WT+ | 0101XX | | |
| WT− | 0110XX | | |
| +WT | 1101XX | | |
| −WT | 1110XX | | |
| CPOP | 101001 | | |
| CPUSH | 111000 | | |

All operations designated RD or WT use the pointer registers, whereas the operations designated CPOP and CPUSH use the control stack pointer. The + or − sign following an RD or WT refers to an increment or decrement operation of the register after it has been used as an address pointer. In the cases of WT where the + or − signs precede the WT, the increment or decrement takes place prior to using the particular register. It should be noted that the coding for CPUSH would appear to be the same as −WT using pointer register 00. Since this register is the program counter, there is no requirement to ever decrement it and then write memory using the decremented value as an address. Therefore, the coding may be used for the CPUSH operation without creating a conflict. There are five other microorders whose codes end in bit pair 00 that, in a manner similar to the situation described above, do not create conflicts in coding. They will be described subsequently as encountered in the following text.

There are four microorders whose coding takes advantage of the fact that the program counter ($R_0$) never has to be written into. For the microorders WT=, WT+, WT− and +WT and −WT for XX = 00, the microorders LDP, STP, Backup and DECODE are substituted, respectively.

The microorder LDP (010000) and STP (010100) specify the use of the low order byte of $R_1$ as the effective address. The memory controller with Q = 1 and X = 0 defines the active page for these microorders. The microorder LDP defines a write memory operation and STP a read memory operation of the effective address.

The following four microorders either take data from link (L) and write into the pointer registers or they read the pointer registers into the link:

| Microorder Mnemonic | Microorder Code; K [0~5] |
|---|---|
| RREG | 1000XX |
| WREG | 1100XX |
| RCSP | 100110 |
| WCSP | 111110 |

The two microorders relating to the four pointer registers $R_0$, $R_1$, $R_2$ and $R_3$ have mnemonics RREG and WREG. In a manner similar to that described previously, the last two bits define which one of the four registers is operated upon. The two microorders, RCSP and WCSP, are discrete in that their singular coding refers directly to the control stack pointer. Since register arithmetic is not required as in the previously described operations, the middle bit pair has significance. The first bit pair has no significance within the context of the overall coding other than 10 defines a read and 11 defines a write operation only within this code grouping.

During the RREG and RCSP microorder operations, the low and high order bytes are swapped while the low order byte is read into the link. During the WREG and the WCSP microorder operations, the high order byte is put into the low order byte register half while the link is read into the high order byte register half.

Associated with operations on the pointer registers $R_0$, $R_1$, $R_2$ and $R_3$ is a microorder with mnemonic CLR whose microorder is to initialize or clear any one of the four pointer registers. The last bit pair defines which register is to be cleared with the same register code designation as in RD or Wt.

There are two microorders, RDCR and WTCR, that control the reading of or writing into the four control registers into and from the link as follows:

| Microorder Mnemonic | Microorder Code; K [0[5] | Register Definition | | | |
|---|---|---|---|---|---|
| | | | XX = | | |
| | | 00 | 01 | 10 | 11 |
| RDCR | 0011XX | Time | Page | Error | Mode |
| WTCR | 0111XX | — | Page | Error | Mode |

Since the time control register, which is actually a counter, is never written into, the code 011100 is used to represent the TRAP microorder. The purpose of this microorder is to select page H in real memory that contains trap addresses. The link is loaded into the effective address register (EA) on page H for selection of the proper word.

There are a number of triple length instructions where the second and third bytes are located in the same binder as the program counter, $R_0$. These two bytes form the address of a byte of information located elsewhere in memory. This byte must be retrieved so that it may be used in the operation of the instruction. There are two microorders that are used to obtain the second and third bytes and these are the SET Z (101010) and SET EA (101011). The SET Z microorder reads the byte from real memory at the address pointed to by the program counter ($R_0$) which immediately follows the instruction itself. This byte is placed on the link and broadcast to all the memory controllers. If a match is found between this byte and a PAGE control register, the Z' flip fop on that page is set to be used in a subsequent priority operation. The program counter is incremented during the SET Z operation in preparation for the SET EA microorder that always follows SET Z.

The SET EA microorder reads the byte from memory that is pointed to by the program counter. Hence, it also comes from the binder for $R_0$. This byte is also placed on the link and broadcast to all Memory Controllers. It is then loaded into the effctive address register (EA) of the Memory Controller previously chosen by the SET Z microorder. Once again the program counter is incremented during the SET EA microorder in anticipation of the next program step.

Immediately following the SET EA microorder is a selection of one or two of the following four possible microorders:

| Microorder Mnemonic | Microorder Code; K [0~5] |
|---|---|
| ABREAD | 100100 |
| ABREAD ODD | 100101 |
| ABWRITE | 111100 |
| ABWRITE ODD | 111101 |

If the instruction requires the reading of a single byte from memory, the ABREAD microorder follows the SET EA microorder. This reads from the page that was designated during the SET Z or TRAP microorders by the setting of the Z' flip flop. The word address on that page was loaded into the effective address register during the SET EA microorder. Reading from this selected location takes place during the ABREAD microorder. If the instruction calls for a second byte to be read from memory, the ABREAD is followed by the ABREAD ODD microorder. This reads a byte from the next consecutive memory location following ABREAD. For proper operation, the memory word address should be even for ABREAD and odd for ABREAD ODD. In either case, the byte read from memory is placed on the link.

The operations for ABWRITE and ABWRITE Odd are similar to the above described microorder in reference to the way that either one or two bytes are handled. However, they differ in that both of these microorders take data from the link and write it into the memory.

The microorder LARG (111111) takes the data on the data link L and interprets it as an argument where each bit has a singular interpretation as follows:

| Microorder Mnemonic | Microorder Code; K [0~5] | Use of Bits on Data Link L |  |  |  |
|---|---|---|---|---|---|
|  |  | L[0]=1 | L[1]=1 | L[2]=1 | L[3]=1 |
| LARG | 111111 | Set OFF | load X→Q | Clear SUS | Set SUS |

The microorder ALU (100111) is a Noop for the Memory Controllers. It is broadcast to the memory controllers whenever the possibility of a conflict due to overlap of operations may occur.

second column of microorders specifies that the output of the Incrementer/Decrementer should be used as the Effective Address (EA); otherwise, for all other microorders in the first column, the input to the Incrementer/Decrementer should be used.

The next five columns specify the microorder groups that select the inputs to the Z output muliplexer. The first and longest column in this group is almost identical to the first column in the Table except for the CPOP and CPUSH microorders. The decoding for both groups is produced by first deconding the MUX select and then 'OR'ing this group with decode for CPOP and CPUSH.

Four of the read microorders (RD=, RD+, RD−, RDCR) may be decoded as a group by examining the first bit pair only. In addition, a RD= microorder with XX=00 is not a valid operation as this code is used to signify a Noop. Therefore, it is necessary to decode the Noop separately and to use this information to similarly inhibit the group decoding. The logic diagram to accomplish this decoding is shown in FIG. 7.

Figure 7:
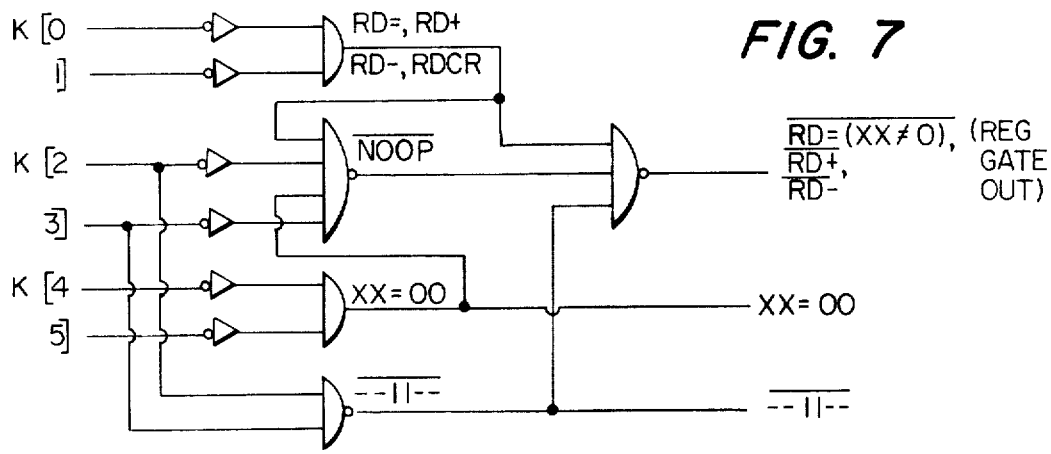
FIG. 7 is a logic diagram of the Read Microorder Decoder.

The notations in the logic diagram of FIG. 7 and subsequent figures include ones (1), zeros (0) and dashes (-). The dashes (-) are mere place holders in the six value word representing "do not care" values. In FIG. 7, for example, the logic signal --11-- means that the first two bits and the last two bits can have any value as long as the middle two bits are 11.

TABLE III:

| MICROORDER GROUPS THAT ARE ACTIVE DURING PRECYCLE | | | | | | | | | |
|---|---|---|---|---|---|---|---|---|---|
| Reg. Data is sent through Inc/Dec. | Output of Inc/Dec is Eff. Add. | Controller Internal Functions Connect input of Z MUX | | | | | Load Low order byte of R, into EA Register | Pointer Reg. select for XX | Control select for XX |
|  |  | to Z FF | to Z'FF | to Q FF | to ZZ FF | to Z''FF |  |  |  |
| RD= | +WT | RD= | ABRD | RDCR | ALU | CPUSH | LDP | RD= | RDCR |
| RD+ | −WT | RD+ | ABRD ODD | WTCR | TRAP | CPOP | STP | RD+ | WTCR |
| RD− | CPUSH | RD− | ABWT | LDP | DECODE |  |  | RD− |  |
| WT= |  | WT= | ABWT ODD | STP |  |  |  | WT= |  |
| WT+ |  | WT+ |  | LARG |  |  |  | WT+ |  |
| WT− |  | WT− |  |  |  |  |  | WT− |  |
| +WT |  | +WT |  |  |  |  |  | +WT |  |
| −WT |  | −WT |  |  |  |  |  | −WT |  |
| SET Z |  | SET Z |  |  |  |  |  | RREG |  |
| SET EA |  | SET EA |  |  |  |  |  | WREG |  |
| CPOP |  |  |  |  |  |  |  | CLR |  |
| CPUSH |  |  |  |  |  |  |  |  |  |
| RREG |  |  |  |  |  |  |  |  |  |
| WREG |  |  |  |  |  |  |  |  |  |
| RCSP |  |  |  |  |  |  |  |  |  |
| WCSP |  |  |  |  |  |  |  |  |  |

PRECYCLE DECODERS

Figure 8A:
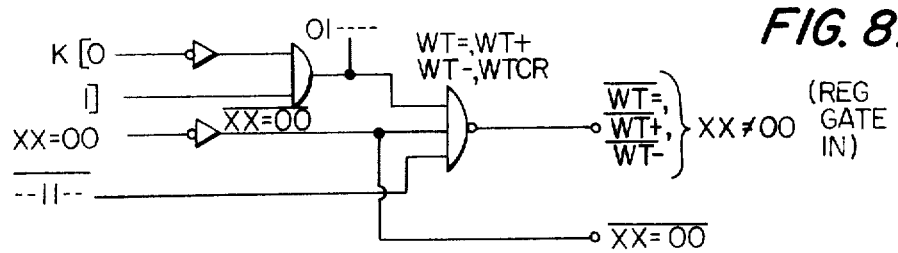
FIGS. 8A and B are a logic diagram of the write microorder decoder.

The previously described Memory Controller microorders must be decoded for use in both the precycle and main cycle intervals. The precycle decoders will be considered first as they operate directly off of the K bus. There are several groupings of microorders wherein each group produces a desired action within the Memory Controller. These groups are summarized in Table III. The longest group of mocroorders defines the pointer register data that is sent through the Incrementer/Decrementer for updating the pointer value or swapping of the byte halves. If any one of the RD or WR microorders in this list is received by the Memory Controller, the contents of the pointer register indicated by bits 4 and 5 is sent through the Incrementer/Decrementer. The microorders SET Z and SET EA cause the program counter ($R_0$) to be sent through the Incrementer/Decrementer while CPOP and CPUSH produce the same effect on the control stack pointer, CSP. The microorders RREG, RCSP, WREG and WCSP use the incrementer/decrementer data path without either incrementation or decrementation. The The WT microorders are decoded by examining the first bit pair for an 01; however, the group contains a WTCR microorder that must be eliminated. By using output of the same decoder that examined the second bit pair in the RD decoder of FIG. 7, an inhibit signal is obtained for eliminating WTCR. In addition, it is necessary to inhibit the decoder output for all microorders in the group where XX=00. The logic diagram of FIG. 8A shows the resulting decoder for producing the group decode of the WT microorders and a second output for $\overline{XX=00}$.

Figure 8B:
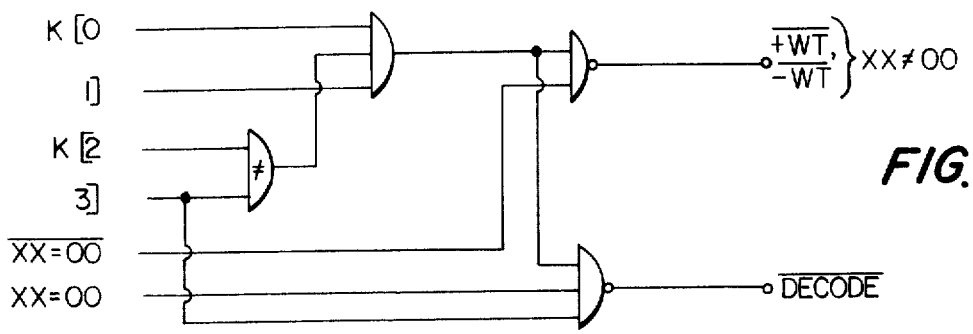

The two microorders +WT and −WT are decoded by examining the first bit pair for an 11, detecting a second bit pair of 01 or 10 with an exclusive 'OR' gate, and inhibiting the decoder for XX=00. The resulting decoder is shown in FIG. 8B along with the decoder for DECODE.

Figure 9:
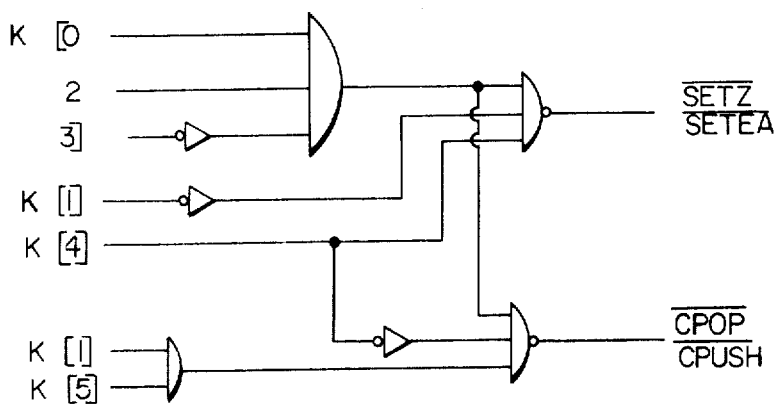
FIG. 9 is a logic diagram of SET EA, SET Z, CPOP and CPUSH microorder decoder.

The three microorders SET Z, SET EA, and CPOP may be decoded as a group by examining the first and second bit pairs for 1010. The microorder pair SET Z and SET EA may then be separated from the three microorder groups by examining bit 4 for a 1. The microorder pair CPOP and CPUSH is decoded by ANDing the previous intermediate decode with bit 4=0 and the exclusive OR of bits 1 and 5. The decoder is shown in FIG. 9.

Figure 10:
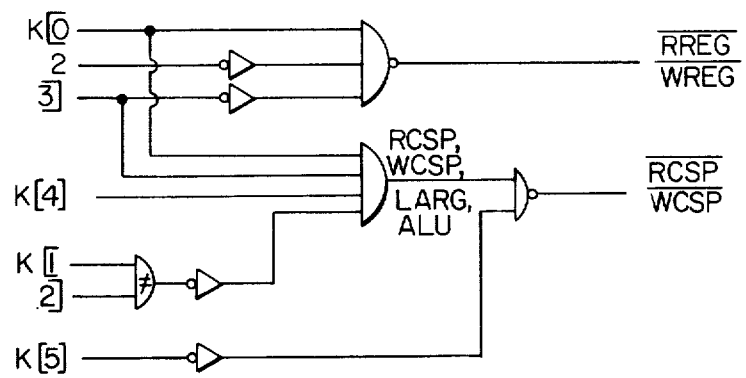
FIG. 10 is a logic diagram of RREG, WREG, RCSP and WCSP microorder decoder.

The four microorders RREG, WREG, RCSP and WCSP are decoded in pairs where RREG and WREG are one pair and RCSP and WCSP are another pair. By examining bits 0, 2 and 3 for a 100 pattern, RREG and WREG are decoded. A pattern of 111 for bits 0, 3 and 4 ANDed with the exclusive NOR of bits 1 and 2 decodes RCSP, WCSP, LARG and ALU. An additional AND operation of bit 5=0 separates out RCSP and WCSP as shown in FIG. 10.

Figure 11:
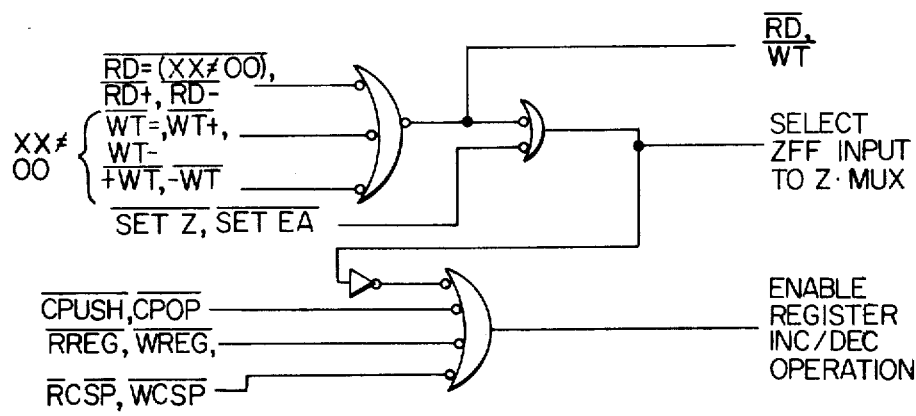
FIG. 11 is a logic diagram of the Z-MUX and Register Inc/Dec decoder.

As illustrated in FIG. 11, a sufficient number of subgroups of microorders have been decoded to produce the Z MUX select control and the enable for the pointer register increment/decrement operation.

Figure 12:
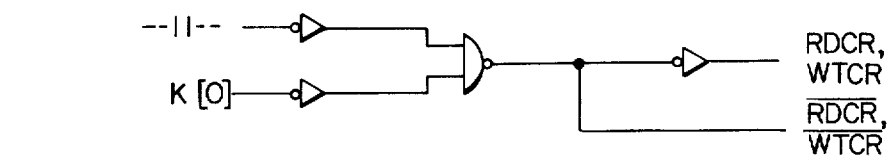
FIG. 12 is a logic diagram of the control register's read and write decoder.

The microorders RDCR and WTCR are decoded as a group by ANDing the previously decoded output --11-- of FIG. 7 with K [0 ] = 0 as shown in FIG. 12.

Figure 13:
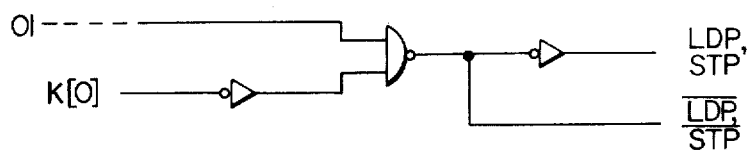
FIG. 13 is a logic diagram of the memory read and write decoder.

The microorders LDP and STP are decoded as a group by ANDing the previously decoded output 01---- of FIG. 8A with K [2] = 0 as shown in FIG. 13.

Figure 14:
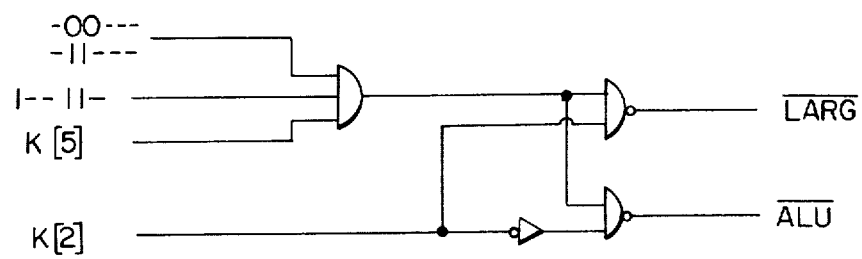
FIG. 14 is a logic diagram of the LARG and ALU microorder decoder.

The microorders LARG and ALU are decoded first as a group and then individually separated as shown in FIG. 14. The TRAP and CLR microorders are individually decoded using a common previously decoded --11-- of FIG. 7 with other signals as shown in FIG. 15.

The microorders ABREAD, ABREAD ODD, ABWRITE and ABWRITE ODD are decoded as a group by ANDing the previously decoded output -00--- and -11--- with the K [0,3,4] = 110. The resulting signal, as shown in FIG. 16, becomes the input control for the Z FF into the Z-MUX. It is also inverted for the use in forther decoding of the microorder Enable for Read and Write.

The five pointer registers ($R_0$, $R_1$, $R_2 R_3$ and CSP) are enabled both for putting data on the internal bus and accepting data from the bus during the precycle. For the microorders RD's WT's, RREG and WREG, the pointer register selection is based on the value of K [4,5]. The microorders SET EA, SET Z, CPOP, CPUSH, RCSP, WCSP, LDP and STP uniquely define the pointer register to be used regardless of the value of the XX. All of these microorders were previously decoded in the precycle decoders for various functions in the memory controller.

The control signal that enables pointer register selection through the use of bits XX is generated by ORing the RD, WT signal of FIG. 11, with the signals for RREG and WREG of FIG. 10 and CLR of FIG. 15 as illustrated in FIG. 23. This group Reg En for XX signal is ANDed with the decoded signal XX = 0 from FIG. 7 and the resultant signal is ORed with the signal from the group decode of the SET Z, SET EA microorder (from FIG. 9). This resultant signal represents any one of all the microorders that use pointer register $R_0$. The $R_0$ enable signal is further gated with the time enable signals, Register Gate Out and Register Gate In, to produce both the out gate and in gate controls. These gating operations are shown in FIG. 23, along with the logic required for enabling all pointer register operations.

Similar to the above operations for developing the register $R_0$ controls, a set of control signals are developed for the rest of the pointer registers $R_1$, $R_2$, $R_3$, CSP. In the case of pointer register $R_1$ controls, the previously decoded signal for LDP, STP of FIG. 13, is ANDed with the decoded and enabled signal for register $R_1$. Thus, an LDP or STP microorder always initiates register $R_1$ in the same manner that SET Z or SET EA initiates register $R_0$. The pointer registers $R_2$ and $R_3$ are enabled only by the decoding of XX, while register CSP is enabled for CPOP and CPUSH of FIG. 9 or RCSP and WCSP of FIG. 10, irrespective of the value XX.

The control signal that enables control register selection through the use of bits XX is the group decode of RDCR, WTCR of FIG. 12.

The memory chip enable signal for Read/Write is generated by ORing the ZFF to ZMUX select signal of FIG. 1 with Z' Enable of FIG. 16, LDP and STP of FIG. 13, and CPOP and CPUSH of FIG. 9. The Z"FF to ZMUX control signal is the group decoding the CPOP and CPUSH of FIG. 9. The selection signal that switches the EA MUX to the output of the Incrementer/Decrementer is obtained by OR'ing CPUSH of FIG. 9 with +WT, —WT of FIG. 8B. The control signal for loading the low order byte of $R_1$ into the EA register is the group decode for LDP, STP of FIG. 13 and LARG of FIG. 14, while the ZZFF to ZMUX control signal is generated by ORing ALU of FIG. 14, TRAP of FIG. 15 and DECODE of FIG. 8B.

THE MAIN CYCLE DECODERS

The decoded microorders required for control in the main cycle are obtained in two ways. First, the microorders as received in the precycle are delayed by means of master-slave flip-flops and the resultant delayed microorders are then decoded during the main cycle, and second, the microorder or microorder groups may be decoded in the precycle and the resultant decoded signals are stored in master-slave flip-flops for use in the main cycle.

As a minimum, for the number of control bits that must be directly delayed, there are three: bits K[1], K[4], and K[5]. Bit K[1] directly defines whether a read or write operation is to take place under a memory chip enable operations. Bits K[4] and K[5] define which pointer register is to be cleared.

A delayed group decoding such as TRAP, SET EA may be obtained by ORing the SET EA with the TRAP microorder in the precycle and delaying the group with a master-slave flip-flop, The delayed output is used to switch the EA MUX intput to the link L. The microorder SET EA is first obtained by ANDing SETZ, SET EA with K[5] = 1 in the precycle and ORing the result with TRAP as shown in FIG. 17.

Both of the flip-flops in the master-slave are D types and thus data is entered on the clock timing. Flip-flop FF1 stores the SET EA, TRAP microorder group decode during the priority interval while FF2 stores the signal during the main cycle interval. The amount of delay encountered in decoding SET EA, TRAP in the precycle interval is not critical as long it occurs before the load clock goes positive on FF1. This master-slave delay circuit is common to those used for all the delayed microorder bits or final decodings. It is also required to make the delayed microorder TRAP available in the main cycle as an independently decoded function. This may be simple accomplished by noting that bit K[1] is a 1 for TRAP and an 0 for SET EA. By ANDing delayed bit K[1] = 1 with delayed SET EA, TRAP, the delayed TRAP decoding is obtained.

The TRAP microorder is used to set the SUS stat if the data link L is less than thirty-two. The bottom gate in the diagram of FIG. 18 tests the value on the data link L and if this value is less than 32, the SUS set signal is generated. For the LARG microorder, if link L[0] is 1, the Q stat is set; if L[1] is 1, X is loaded into Q FF; if L[2] is 1, the SUS stat is cleared; if L[3] is 1, the SUS stat is set. The microorder LARG' is derived from a master-slave delay network. The control signal that selects the ZFF for input to the Z MUX in the precycle is delayed by master-slave delay circuit and is used to control the TIME register in the main cycle.

Figure 19:
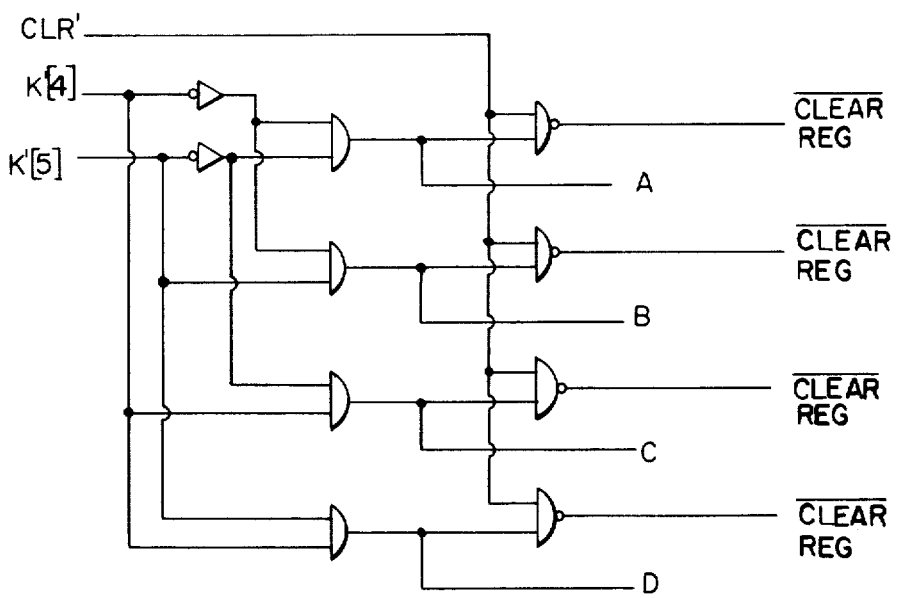
FIG. 19 is a logic diagram of the clearing pointer registers.

The CLR' microorder, derived from a master-slave delay circuit, is used to clear the pointer registers. The gating logic for decoding the register clear control is shown in FIG. 19. Each gate decodes a particular register from control bits K'[4,5] and is enabled by the decoded CLR' microorder. The control bits are delayed in the master-slave delay circuit. The outputs A, B, C, and D are used in the RDCR and WTCR gating circuit of FIG. 20.

The delayed microorder group RDCR', WTCR', as derived from a master-slave delay circuit, is used to control the reading or writing of the control registers as identified by the control bits K'[4,5], as shown below:

| RDCR' | | WTCR' | |
|---|---|---|---|
| K'[4, 5] | READ: | K'[4, 5] | WRITE: |
| 0 0 | TIME | 0 0 | — |
| 0 1 | PAGE | 0 1 | PAGE |
| 1 0 | ERR | 1 0 | ERR |
| 1 1 | MODE | 1 1 | MODE |

Figure 20:
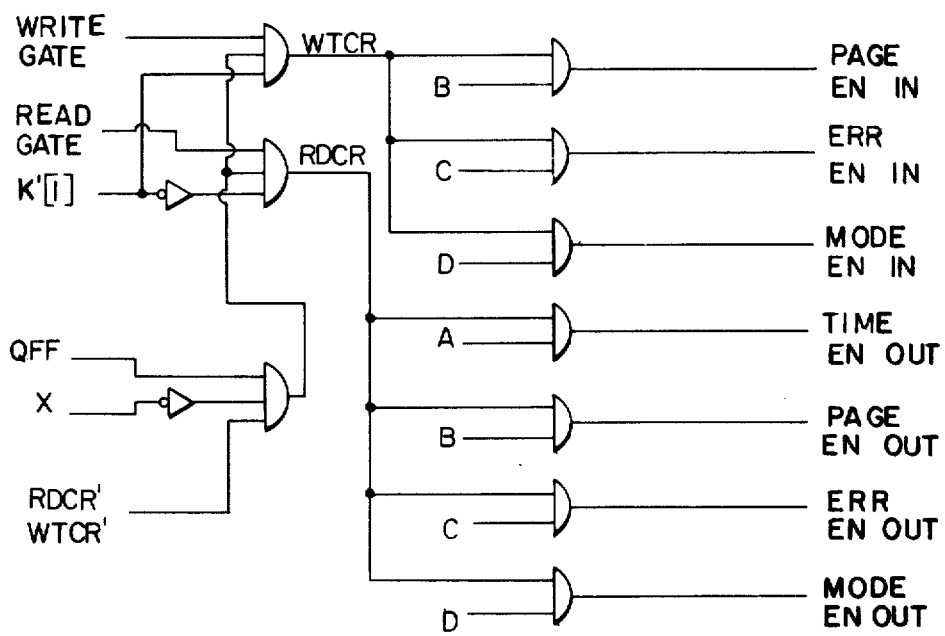
FIG. 20 is a logic diagram of the control register's in and out logic.

During a RDCR' microorder, the designated register on the Memory Controller having a Q = 1 and an X = 0 (Top Memory Controller with Q = 1) reads out to the data link L. For the WTCR' microorder, the designated register on a similarly chosen Memory Controller as above is written into from the data link L. Since the TIME register is never written into, there is no need to use the WTCR' microorder with K'[4, 5] = 00. This particular microorder coding is used to represent the TRAP microorder. The gating logic for control of the control register is shown in FIG. 20. The output of the QFF is ANDed with the complement of X and the group decoded signal RDCR', WTCR' to produce a driving signal for the microorder separation gates. By ANDing this signal with both the true and complemented values of K'[1], the microorder WTCR' and RDCR' are separated, respectively. Into each gate also is introduced the time gating signals for establishing the proper write and read intervals. The resulting WTCR' and RDCR' gated microorders enable one of seven gates that provides control over the writing or reading of the proper control register. Each of these gates is also driven by A, B, D, C, the proper decoding of control bits K'[4, 5] as decoded in the circuit of FIG. 19 for register clearing.

Reading or writing in the memory always takes place during a main cycle interval, and therefore, requires delayed control signals. The required signals are the delayed microorder enable and delayed control bit K'[1] that specifies a read or write operation. The microorder enable for read or write is decoded in the precycle and consists of the following microorders:

1. RD (RD =, RD+, R$^-$)
2. WT (WT =, WT$^+$, WT$^-$, +WT, −WT)
3. SET Z, SET EA
4. CPOP, CPUSH
5. LDP, STP
6. ABREAD, ABREAD ODD
7. ABWRITE, ABWRITE ODD.

Figure 21:
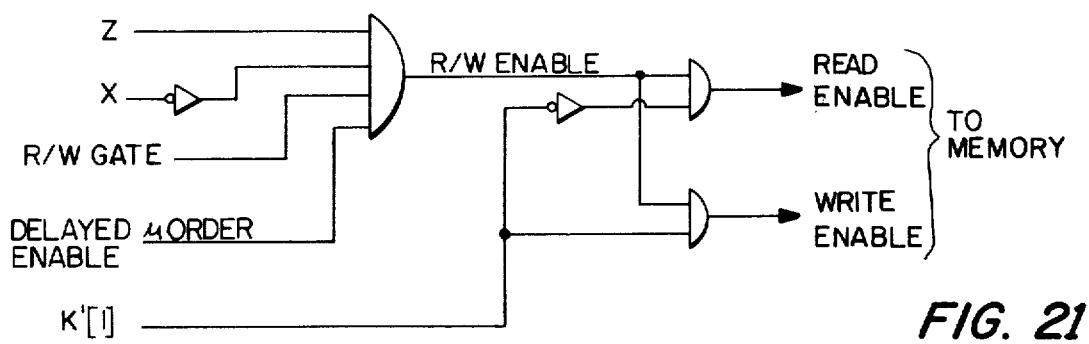
FIG. 21 is a logic diagram of the memory Read/Write control logic.

The enable signals for reading or writing on the selected memory controller is obtained by ANDing Z with the complement of X. Proper timing of the read or write operation is obtained by introducing a R/W gate signal into the logic. The true or complemented value of K'[1] defines whether a write or read operation is produced, respectively. The control logic for the memory read/write functions is shown in FIG. 21.

Figure 22:
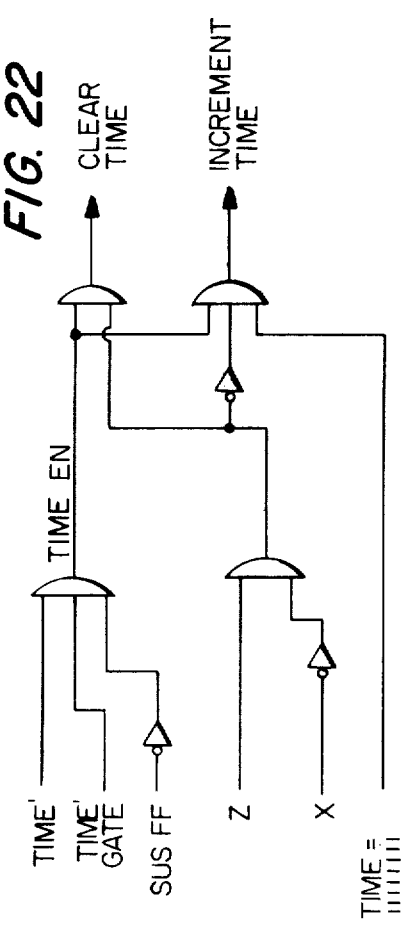
FIG. 22 is a logic diagram of the TIME control Register control logic.

The control of the TIME control register is a main cycle operation that uses the delayed signal TIME'. This signal is the delayed microorder decoded in the precycle that selected the ZFF as input to the Z MUX (See FIG. 11). TIME' is ANDed with the complement of the SUS FF and the TIME gate. The resulting TIME Enable signal is further ANDed with both the true and complemented values of the result of ANDing Z with the complemented of X. If Z ANDed with $\overline{X}$ is true, a signal is produced for clearing the TIME register; if false, the TIME register is incremented, provided that the TIME count is not equal to 255 (all ones). The TIME control logic is illustrated in FIG. 22.

The Memory Controller, as illustrated in FIGS. 24A-D, includes the Memory Control Signal Decoder, the Pointer Register, an Incrementer/Decrementer/Transfer Circuit, and the Control Register and Z Logic.

Figure 24B:
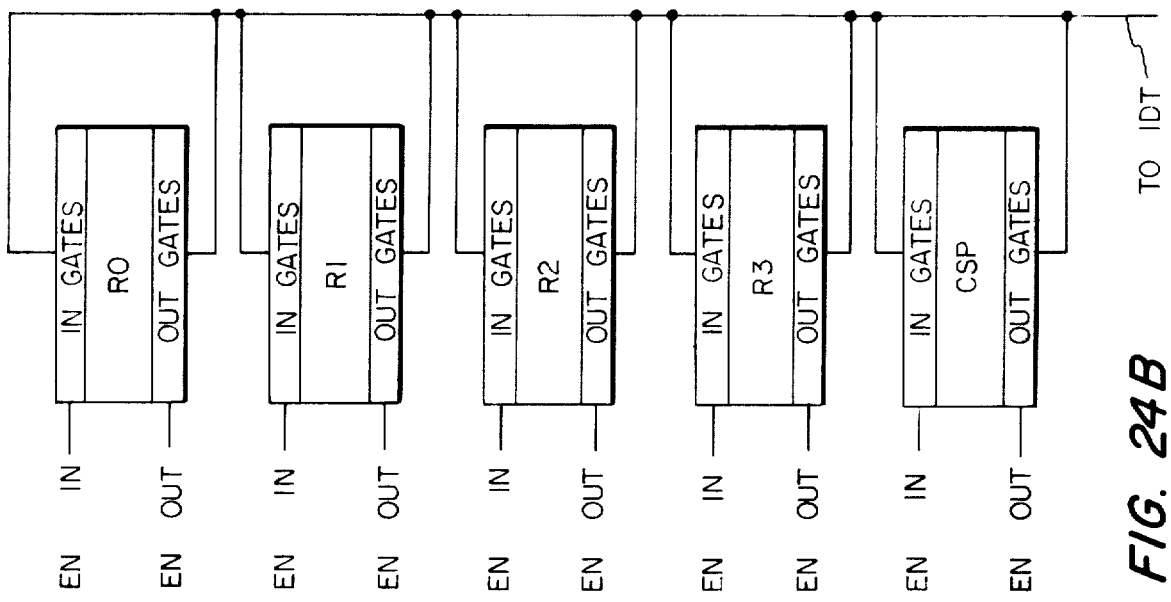
FIGS. 24A, B and C and D are expanded diagrams of the memory controller.
Figure 24A:
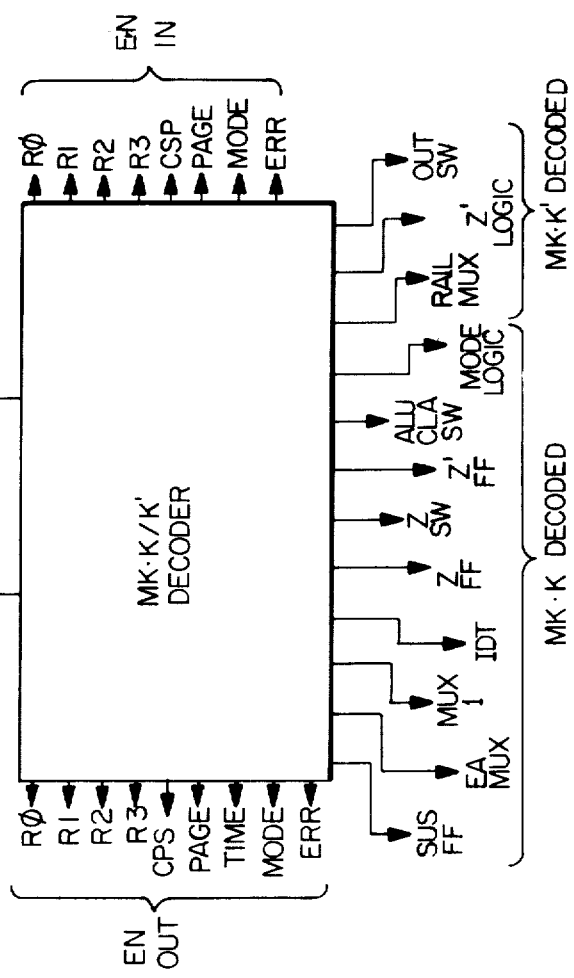

The Memory Control signal decoder is shown in FIG. 24A as a block MK.K/K' decoder. This block represents a summation of all the functions and control signals needed in the Memory Controller which are provided by the logic diagram of FIGS. 7-23.

Figure 24C:
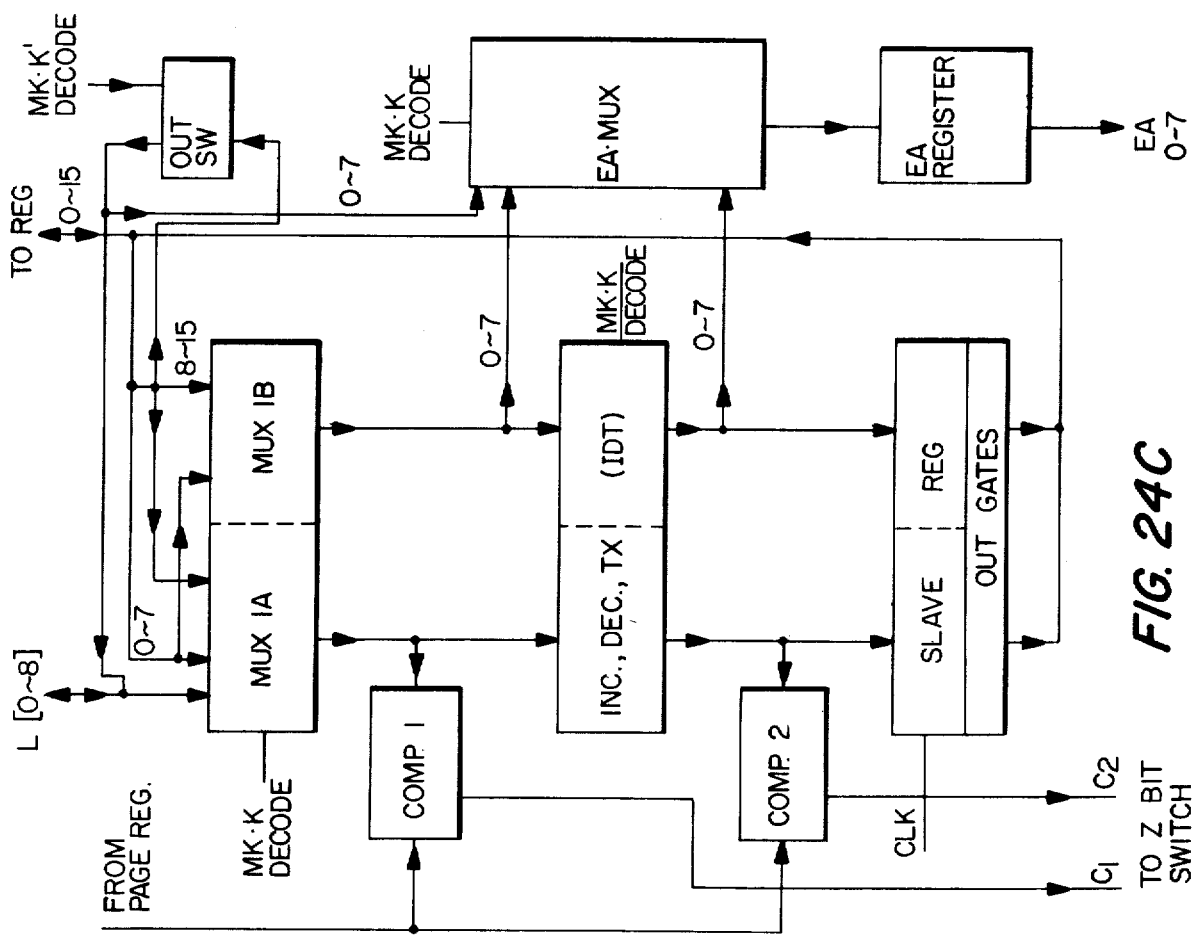
Figure 24D:
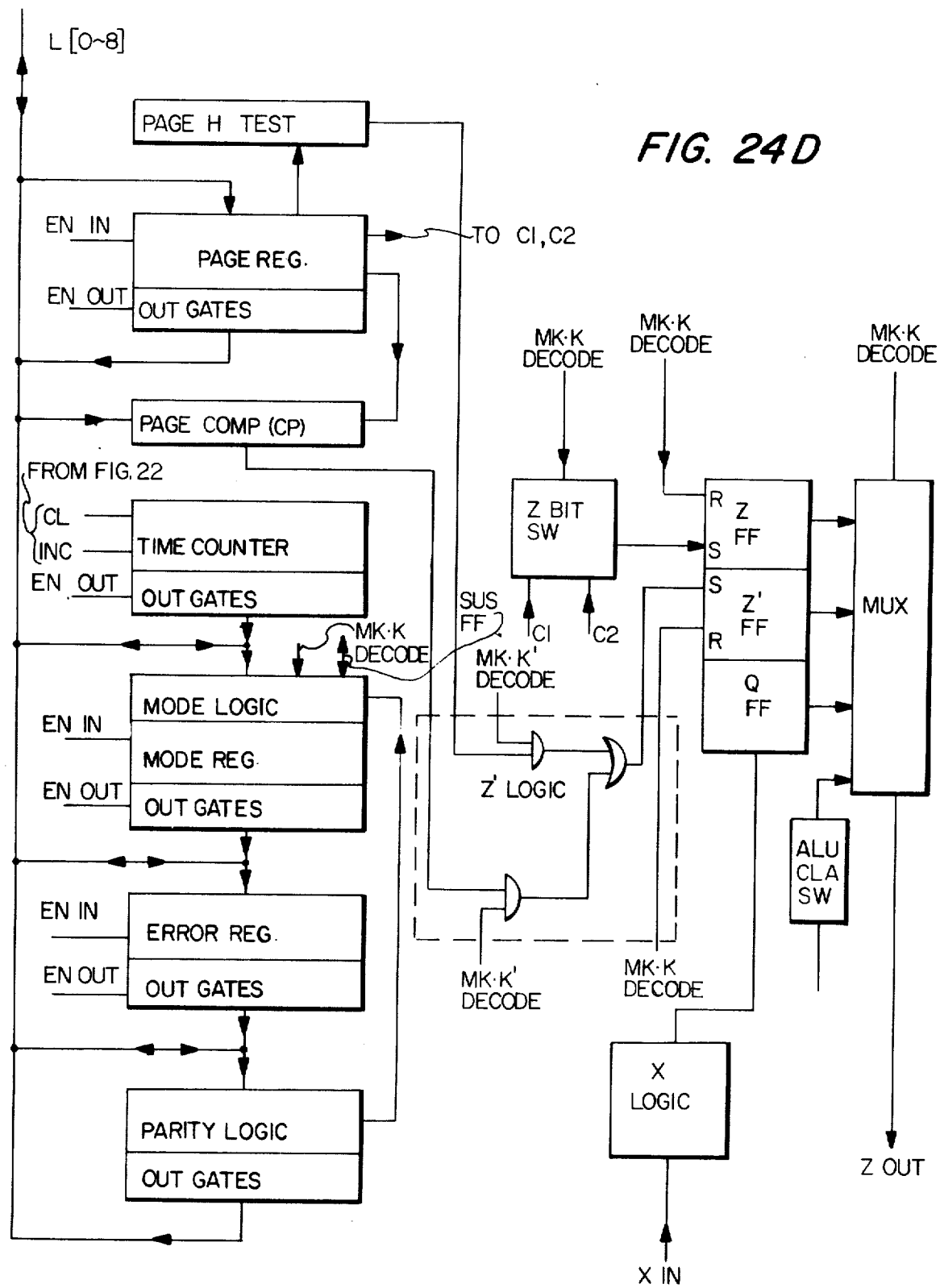

The memory Control Signal Decoder provides read and write enable signals to the input and output gates of the five pointer registers R0, $R_1$, $R_2$ and $R_3$ and CSP of FIG. 24B and the PAGE, TIME, MODE and ERR rgisters of FIG. 24D. The MK.K/K' decoder provides signals from microorder MK.K to the Increment/Decrement/Transfer circuit (IDT) and a byte multiplexer (MUX I) of FIG. 24C and to SUS FF, Z FF, Z SW, Z' FF, ALU, CLA, SW and MODE Logic of FIG. 24D and provides signals from delayed microorder MK.K' to OUT SW and EA.MUX of FIG. 24C and to RAIL MUX and Z Logic of FIG. 24D. It should be noted that MK.K represents the precycle microorders and MK.K' represents the main cycle microorders.

The five pointer registers (R0, $R_1$, $R_2$, $R_3$ and CSP of FIG. 24B) have their input and output connected to a sixteen bit register buss which is also connected to the IDT circuitry. The communication of the pointer registers with the data buss L and the Effective Address Register (EA Reg) is included in the description of the circuitry of FIG. 24C. The Incrementer/Decrementer/Transfer circuitry, as shown in FIG. 24C (IDT), includes a byte multiplexer, which accepts register data (sixteen bits) and link data (eight bits) and developes a new data composite having one of three possible formats as shown below:

1. $HOB_O$ → $HOB_N$; $LOB_O$; $LOB_N$ → No Byte Swapping)
2. $LOB_O$ → $HOB_N$; $HOB_O$; $LOB_N$ → (Byte Swapping)
3. L → $HOB_N$; $HOB_O$; $LOB_N$ → (Link L + Byte Shift).

In the first case, which is a byte transfer operation, the old high order byte (HOB$_0$) from the 16 bit interval bus is transferred unswapped to become the new high order byte (HOB$_N$) on the bus, while a similar situation occurs with the low order byte. The second case defines a byte swap operation where the old high and low order bytes swap position to become the new low and high order bytes, respectively. The third case allows the old high order byte to transfer to the new low order byte while link data (L) fills the new high order byte.

The following microorders require multiplexer control to allow data transfer with:
1. No Byte Swapping:
   RD: (RD=, RD+, RD−)
   WT: (WT=, WT+, WT−, +WT, −WT)
   SET Z, SET EA
   CPOP, CPUSH
   LDP, STP.
2. Byte Swapping:
   RREG
   RCSP.
3. Link L and Byte Shift
   WREG
   WCSP.

The group decoder, as illustrated in FIG. 25, for the straight transfer microorders OR's the group decoder for the list, which has already been decoded in FIG. 11 to enable the ZFF to Z MUX, with the signal CPOP, CPUSH to FIG. 9 and LDP, STP of FIG. 13 sub-group decoded signals. The resultant signal is ANDed with the MUX Gate to provide proper timing of the resultant MUX control.

The byte swap and byte transfer operation MUX control signals are obtained by first ORing the previously decoded pairs RREG, WREG of FIG. 10 and RCSP, WCSP of FIG. 10. This common decode is then ANDed with control bit K[1] in is true and complemented value to separated out the sub-groups RREG, RCSP and WREG and WCSP. The MUX Gate is also ANDed with these two sub-groups to obtain proper timing of the MUX control.

The byte multiplexer is shown as two multiplexers MUXIA and MUXIB. Eight bits of the nine bit word on data buss L are fed into MUXIA, which also has inputs of the first eight bits and the second eight bits of the 16 bit pointer register buss, MUXIB has only two inputs of the first eight bits and the second eight bits of the 16 bit pointer register buss. The decoded MK.K control signal from MK.K/K' decoder determines which input of each multiplexer MUXIA and MUXIB should be outputed to form the new composite data.

The output of MUXIA and MUXIB are incremented, decremented or transferred in IDT by adding a one, subtracting a one or adding a zero to the 16 bit word from MUXI. Since the IDT operation is monadic, a basic half adder circuit with carry look-ahead is used. A four stage increment/decrement IDT circuit is illustrated in FIG. 26. The inputs A$_i$ produce sum output S$_i$ or difference outputs D$_i$ under the control of the increment or decrement control signal Inc/Dec and the Carry Look-Ahead signals C$_{in}$/B$_{in}$ and P$_G$ representing carry in, borrow in and group propagate, respectively.

In order to use the IDT circuit as a incrementer, a '1' is put on the C$_{in}$/B$_{in}$ while a '0' is put on the Inc/Dec input. Similarly, for a decrement, a '1' is put on the C$_{in}$/B$_{in}$ input; however, a '1' is also put on the Inc/Dec input. For a straight through transfer, a '0' is put on the C$_{in}$/B$_{in}$ input while either a '0' or a '1·2 is put on the Inc/Dec input. (Adding or subtracting a '0' with the input variable results in the same output or a straight transfer.)

The sixteen bit IDT comprises four of the stages of the IDT of FIG. 26. A second level of carry/borrow look ahead is provided by the logic as shown in FIG. 27 to interconnect the four IDT units.

The control signals for the IDT are generated from the decoded memory controller microorders MK.K. These microorders, grouped by IDT function, are:

| Increment | Decrement | Transfer |
|-----------|-----------|----------|
| RD+       | RD−       | RD=      |
| WT+       | WT−       | WT=      |
| +WT       | −WT       | RREG     |
| CPOP      | CPUSH     | RCSP     |
| SET Z     |           | WREG     |
| SET EA    |           | WCSP     |
| LDP       |           |          |
| STP       |           |          |

The first Increment microorders RD+, WT+, and +WT may be decoded as a group by testing the second bit pair of K for a 01 and inhibiting the output if the first bit pair is a 10. This latter expedient precludes ABREAD, ABREAD ODD, RCSP and ALU. Although this decoding allows DECODE to appear in the increment list, there is no detrimental effect since neither link nor register data is introduced into the IDT. The remaining microorders in the increment list CPOP, SET Z, SET EA, LPD and STP were previously decoded in the precycle function decode operation. Therefore, they may be ORed with the above decoded microorders to provide the Increment enable as shown in FIG. 28.

The Decrement control function is generated by testing the second bit pair of K for a 10 and inhibiting the output when the first bit pair is a 10 to eliminate the microorders CPOP, SET Z, and SET EA. The logic diagram of the IDT control decoders is shown in FIG. 28. The output of the incrementer decoder is ORed with the output of the decrementer decoder to produce a C$_{in}$/B$_{in}$ signal = '1'. The incrementer decoder output also becomes the Increment/Decrement control line so that an increment operation causes this output to become '0'. For only microorder other than those that cause an increment, the output becomes '1' specifying a decrement operation. This is not detrimental for those microorders other than the Decrement group as no data is passed through the IDT. For any microorder other than those in the Increment or Decrement group, the C$_{in}$/B$_{in}$ signal is a '0' which allows a data transfer.

The 16 bit word, from the IDT of FIG. 24C, is sent to a slave register for transmission back to the 16 bit pointer register buss in the main cycle as determined by a clock pulse input CLK. The new address calculated by MUXLA, MUXIB, IDT and slave registers use the precycle control signal MK.K. This calculation is performed while the preceding main cycle is being executed using the delayed control signal MK.K.

The output of MUXIA, which is generally the high order eight bits of a pointer register and the high order eight bits of the IDT, are each compared with the eight bit word in the PAGE register in comparators C1 and C2, respectively. The comparison is used generally for indirect addressing and provides a comparison for an eight bit word before or after being incremented or decremented. The results of the comparison are transmitted to the Z bit switch of FIG. 24D as signals C1 and C2.

The output of MUXIB, generally the low order eight bits of a pointer register, the lower eight bits of the IDT and the low eight bits of a pointer register which is being transmitted to the data link L, are inputs to an effective address multiplexer EA.MUX. The precycle decoded control signal MK.K is used to determine which of the three inputs will be transmitted by EA.-MUX, as previously explained in the decoder section. The lower eight bits of a pointer register to be transmitted is from an output gate which transmits the low order eight bits of a pointer register [8 ~ 15] onto the data link L under the control of the delayed decoded control signal MK.K.

The remaining logic and register, illustrated in FIG. 24D, includes the PAGE register which stores an eight bit address identifying the memory segment. PAGE receives input from the data link L and provides output to comparators $C_1$ and $C_2$, a Page H Test Circuit and a Page Comparator ($C_p$). Page H is a protected page of memory which includes the trap handlers. To save time, page H has been assigned the address 11111111, so that Page H Test Circuit "AND"s all the inputs to provide an output to the Z' logic in response to a Page H test request. Since all of the memory chips may be checked simultaneously by a simple logic circuit without the transmission of an address on the data links L to which it is to be compared, the trap handle is located in optimum time. It should be noted that Page H may have almost any address and the appropriate logic designed to perform a Page H test.

The Page Comparator, $C_p$, compares the byte (eight bits) on data link L directly with the PAGE register and provides an output to the Z' logic upon a match. The Page H test and the Page Comparator $C_p$ are direct addressing, whereas the pointers with comparators $C_1$ and $C_2$ are for pointer (i.e. index) addressing. The output from the Page H Test circuit is "AND" with a decoded trap signal from the delayed K' to also set the Z' flip flip. The Z' flip flop is cleared by a decoded fetch signal from K.

For pointer addressing, the signals from comparators $C_1$ and $C_2$ are inputted to a Z bit switch which is controlled by a decoded MK.K signal to select which input will be used to set the Z flip flop. $C_1$ is used to effect postautoincrementing or post-autodecrementing while $C_2$ is used to effect preautoincrementing or preautodecrementing. The Z flip flop is reset by an appropriate decided MK.K signal.

The Counter TIME is incremented for each read or write command and is reset if the read or write command is executed by the page it is on by control signals INC and CL from FIG. 22. Also, the TIME is prevented from counting by a MODE Stat for special conditions, for example, while a page is being brought in from memory to another page. The contents of TIME can be put on the data link L for determining which page is to be sent back to the secondary memory.

The Error register and the parity circuit have been previously described.

The Mode register has associated therewith a Mode Logic which test and/or changes various of the mode status bits in response to decoded control signals MK.K.

The memory controller has two stats not in the MODE register. These are the suspend stat SUS and the queue stat Q. SUS, which is equal to the complement of the user stat U in the CPU, is set when the CPU executes a TRAP $n$ where N is less than 16, and by all I/O traps (Traps 0). SUS is cleared by a decoded RELEASE instruction. While SUS is 1, TIME and the write enable mode stat W are not changed, and the privileged mode enable P permits reading or writing on the chip if it is 1. If SUS is 0 and mode stat P is 1, the chip may not be written on.

The queue stat Q stored in a Q flip flop is used to choose a memory controller. The output from the Z, Z' and Q flip flops are transmitted onto a priority rail. A multiplexer RAIL-MUX, being controlled by a delayed decoded control signal MK.K, determines which flip flop will be transmitted onto the priority rail as Z out. A fourth input into RAIL-MUX is from an ALU-CLA switch which is set by a decoded control signal MK.K which informs the memory controller that the Arithmetic logic Unit (ALU) wans to use the priority rail for carry look ahead operations.

PRIORITY RAIL

Figure 29:
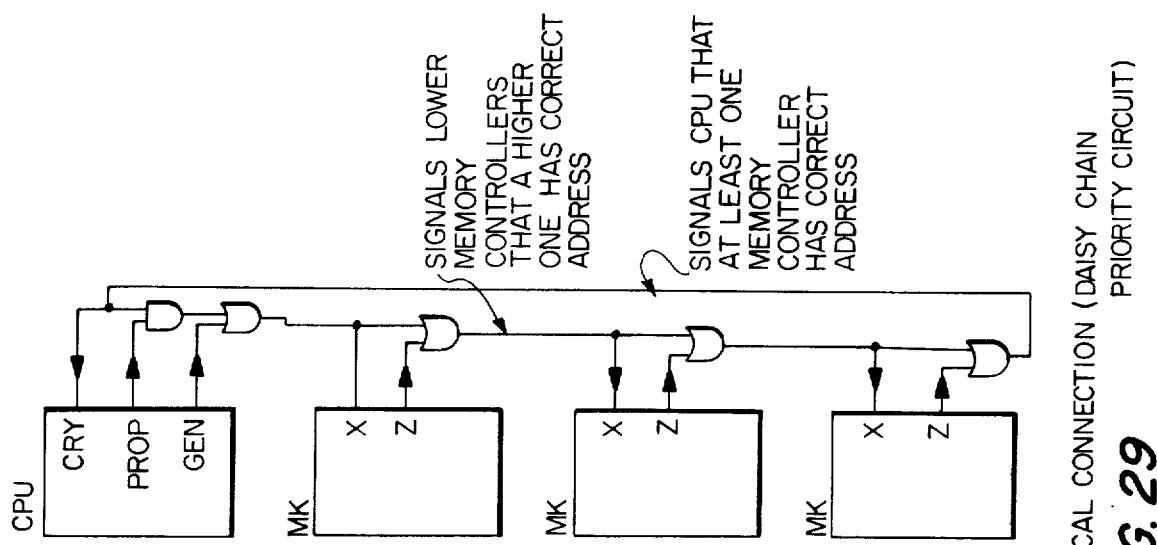
FIG. 29 is a schematic of the logical connection of the memory controllers in a priority rail.
Figure 30:
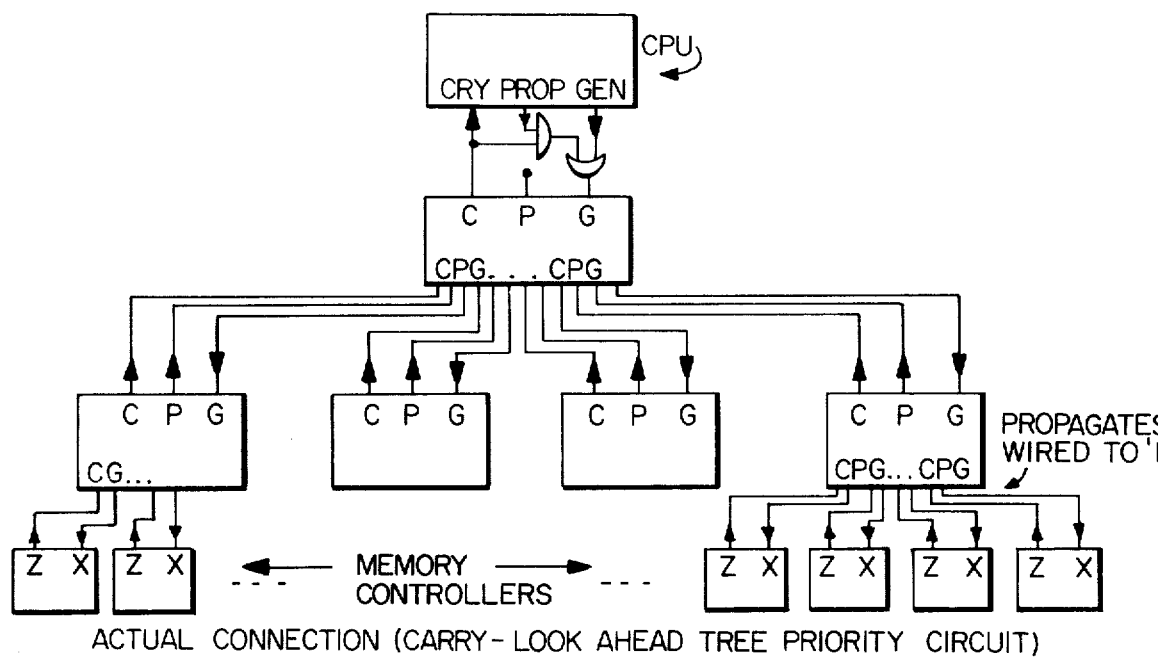
FIG. 30 is a schematic of the actual connection of the memory controllers in a carry-lookahead tree priority rail.

The memory controllers are logically ordered as a top-to-bottom daisy chain priority circuit as illustrated in FIG. 29. The memory controllers are actually connected as a carry look ahead adder in a tree structure as illustrated in FIG. 30. The priority rail is used to resolve conflicts in a normal read or write. In the event that one or more memory controllers have the same value of PAGE as determined by the Z flip flop, for indirect addressing and Z' flip flip for direct addressing and are enabled, each will output a 1 on their Z terminal. This simultaneously signals the X input of the CPU, so that it is notified that at least one memory controller is responding. The condition for reading or writing is that Z terminal is 1 and X is zero in the memory controller. Thus, only the topmost memory controller with the correct value of PAGE and enables will respond, since all lower memory controllers will have Z equal to 1 irrespective of their Z terminal value.

If none of the memory controllers would have had a page match, either by direct or pointer addressing, the CRY input to the CPU would be zero and a TRAP would be executed to indicate a Page Fault.

The priority rail with the STAT Q is used choose a memory controller directly without the previously discussed addressing techniques. An instruction SETQ causes the Q stat to be set in all memory controllers. An instruction STEP causes the topmost controller with Q = 1 to clear Q. This is done as follows. The CPU sets propagate PROP to 0 and generate GEN to 0. Each memory controller loads Q out into its Z terminal, then loads the X input into Q. Each time STEP instruction is repeated, the next memory controller in the logical chain configuration is selected.

The same rail is used to signal errors. A stack check is performed on the control stack and on the operational stack in real memory. These stack checks permit the operating system to examine the stack pointers to see if they are out of bounds because a TRAP is executed as a result of the signal sent on this rail. A memory controller will generate a 1 on this rail if the control stack pointer is used and the rightmost seven bits are all zeros. This gives a TRAP. This memory can be allocated to the control stack in 128 word segments. The TRAP will be executed, among other times, when either end of the control stack space is addressed by the control stack pointer. Similarly, if the memory has a real memory, the MKH chip will generate a 1 on the rail if the rightmost eight bits of the address are 0, R1 is being used and F is in its MODE register. There, the operational stack can be allocated in 256 word blocks, and a TRAP will be executed, among other times, when either end of this stack are addressed by R1.

It should be noted that upon initiation of the system, all values of PAGE will start up the same, say to all zeros, Register R0 will be initialized to zero. So the first instruction will be fetched from the topmost page. Thus, the topmost page should contain the IPL (initial program load) program in a read only memory. Further, after the IPL is completed, the mode bits on that page can be cleared so that it disappears from the addressable memory space. If virtual memory is mixed with regular memory, the controller MKH should be the last page on the bottom. That way, any virtual memory page can override the regular memory. In particular, the IPL page can be virtual, combined with a regular memory.

Finally, it should be noted that a regular memory has to have two memory controllers, an MKH and an MKL. The MKH chip, on the bottom, generates read enable and write enable signals for regular memory. The mode bits in it can be used to enable regular memory. The mode bits in it can be used to enable regular memory for specific registers and so on. The MKL chip mode bits and read and write enables can be used to control one virtual memory page, say for the IPL page or other uses.

The regular memory may contain some 256 bit, 1,000 bit and 4,000 bit memory segments. In order to achieve a measure a protection from addressing non-existing "pages" similar to that off the virtual memory pages, the high order eight bits of the address, from MKH, can be input to a 256 bit ROM. The ROM can be programmed to output a 1 if a "page" of regular memory is present. The output of this ROM can be ANDed with the Z output of the controller MKH in FIG. 30. By this means, the CPU can generate an interrupt upon attempt to address a non-existent word.

INITIALIZATION AND INITIAL PROGRAM LOAD

The IPL (Initial Program Load) requires the use of a ROM (read only memory). The memory controllers for all memory chips, RAM'S, ROM'S, and I/O pages, will come up with zero in R0, and PAGE MODE bits enabled for R0-R3, write and protected and SUS enabled. The CPU must come up ready to fetch with interrupts disabled and in the privileged mode. The IPL ROM must have the highest physical priority because all memory controllers are page zero. The IPL will set the page numbers of the pages and their mode bits and read in the operating system from secondary store or jump to an operating system on ROM'S.

The rename procedure will therefore use a hardware priority circuit so that the (physically) first memory controller in the hardware priority line that have a given value of PAGE will rewrite the new value of PAGE, and no other memory controller will rewrite it. So, for example, to get three memory controllers with PAGE equal to 1, 2 and 7, respectively, we apply power, and all memory controllers are, say, automatically assigned 0 to PAGE. Then using the rename routine, on all chips with PAGE = 0, the physically topmost memory controller will be renamed PAGE = 1, and the others will remain PAGE = 0. Then repeating, the physically topmost memory controller with PAGE = 0 will be renumbered to give it PAGE = 2. This operation being completed, PAGE = 0 is renamed PAGE = 7.

The IPL, including renaming the pages, begins with pointer R1 pointing to the IPL ROM of 1 and setting the Q flip flop in all the memory controllers. The priority chain is moved from memory controller to memory controller by the stepping operations. The pointer R1 is incremented pointing to the names of the pages for each memory controller.

POINTER REGISTERS

For the most part, the memory is addressed by the 16 bit pointers in the same way as for other computers. However, program counter R0 cannot address the highest numbered page, called page H, when the CPU is in the user mode (U = 1). This page is used to store trap addresses or trap handlers. The user's R1 cannot address some higher number pages set aside by the system. These pages store system data and the control stack. The terms "bound for register $i$, " "page fault" or "protected page" will be explained in later sections. For non-virtual memories, all words will be bound for all registers and no pages are protected. However, page H is used in non-virtual memories to store trap addresses, as it is in virtual memories.

Generally data is moved by setting the value of a pointer register to access it. All the registers can be set from a directly addressed double byte (16 bits) word or from the stack. Conversely, these pointers can be stored in a directly addressed double byte word or in the stack. The stack can therefore be used for pointer calculations, when it is not in the middle of useful data. However, since it is often tied up, some arithmetic can be performed entirely within the registers without goint to the stack. Registers can be incremented or decremented, or the value of COUNT or a directly addressed byte pair or the two bytes on the top of the operational stack can be added to or subtracted from the register. Most movements of data can be done this way. Finally, register R1 can be saved on the control stack and later restored. This will be used both in subroutines and loops.

There are five ways to change the instruction sequence in this machine. These are the trap, branch, jump, call and R0 pointer operations.

A trap is either executed as an instruction or evoked upon a page fault. The old value of R0 and STATUS are stored on the control stack. The address of the routine is taken from page H. 64 traps, each with a separate address on page H, are available. The first 16 are traps to the operating system, which cause the privileged mode to be entered. Eight of these are reserved for hardware faults. The user should use the remaining 48 traps in place of subroutine calls wherever possible because they are single length instruction. 64 additional traps can be used by I/O.

A branch can be conditional or unconditional. It can move R0 ± 255 words from the branch instructions. The condition codes C, Z, N, V and M of the CPU status vector (except U (user), I (interrupt enable) and P (parity check enable), can be tested. In place of these codes, one can test the value of V ≠ N, which is the sign bit after two's complement compare, seven bit parity after a logic or PUSH operation, the interrupt request flip flop INT-REQ, and the value of COUNT in an end of a loop instruction.

A jump or call unconditionally jumps to a 16 bit absolute addressed location specified by an immediate operand. The call, like a trap, puts the old value of R0 on the control stack but does not save STATUS. For either a trap handler or subroutine, a return is made by a return instruction.

It should be noted that the pointer instructions, with pointer R0 are also able to change the instruction sequence. (The machine is restarted after a halt by an interrupt request.) Indirect jump, computed go-to, and relative branches are used. The present value of the program counter can be obtained by instructions. This can be used, for example, in a relative call. R0 can be pushed, a constant added to calculate the return address, the result popped from the operational stack to the control stack and the routine can be entered by a jump instruction.

This hardware supports a pair of stack oriented subroutine conventions (i.e. short and long). Although other conventions are possible, the following conventions reduce the amount of virtual memory "thrashing." Both schemes pass arguments on the stack. If the arguments are already on the stack, a CALL instruction can be executed. However, a conditional call may require putting arguments on the operational stack after the condition is evaluated.

A short subroutine is one that operates on the operational stack and condition codes in a direct way. Multiprecision push would be such a subroutine. In general, the calling routine will have one or more arguments on the stack. It will then PUSH the length of the multiprecision numbers, using the PUSH n instruction. The subroutine will pick up these parameters, using an instruction to set up the LOOP. Note that such subroutines can be completely relocatable. If the parameter is needed more than once, it can POP the number into a common descriptor table, say at location A, and then set up a LOOP or store it on the control stack using PUSH and POP instructions for relocatable subroutines.

A long subroutine is one that requires the saving of pointers and establishing new values. The calling routine will first allocate space on the operational stack for return values for call by value arguments. This is done by an instruction to allocate n words. Input arguments for call by value should be then pushed. Call by name addresses would then be loaded. The entire descriptor would be pushed for each argument using PUSH n instructions. The CALL instruction is then executed. The subroutine begins by saving pointers and the condition code on the operational stack.

The subroutine then moves descriptors from the stack into its own descriptor tables using PUSH n instructions. (Note that, since descriptor tables are directly addressed, long subroutines may be relocated if necessary, by a relocatable loader.) Then it may allocate space on the control stack for local variables, if they are declared in the subroutine. Alternatively, local variables can be dynamically allocated, as they are produced. This procedure will be explained shortly. A high level language expression like A ← B+C will be executed by pushing B onto the stack and then C. The multiprecision add subroutine will leave the sum A on the operational stack.

In dynamic allocation, four possibilities exist. Either a computed value, like A above, has not previously been allocated or it has been allocated and the new value is of a different size than the old value, or it has been allocated and the new value is the same size as the old value or it can be a call-by-value argument. (These cases can be established by examining the descriptor of the variable.) In the last two cases, a multiprecision POP routine is used to put back the value. However, in the first two cases, the value can be left where it is on the stack and the descriptor can be rewritten so that it refers to the newly written area of the stack. Note that in dynamic allocation, many variables are computed "on the spot" because they are left where they were computed. This saves time because they do not have to be moved from the top of the stack to their storage areas.

The subroutine conventions above tend to limit the writing of words to just a few pages, namely those at the head of the stack and those containing the descriptor. This speeds up the paging scheme because a page that is not written in does not have to be output to the secondary memory when a new page is brought in to replace it.

As discussed previously, looping is controlled by a 16 bit counter COUNT in the CPU. The value of COUNT can be initialized in A DO instruction from an immediate or direct addressed operand, or from two bytes from the top of the operational stack. The carry bit is set to 1 or 0 by this instruction. A loop can be terminated by an END, REPD, or REP instruction. They first test COUNT and then decrement it. If COUNT was 1, the next instruction is executed. Otherwise, for an END instruction, a branch is taken, which can move R0 ± 255 locations; for a REPD or REP instruction, R0 is moved back to execute the previous one or two instructions.

The looping operation can be used for string/multiprecision moves. A general move can be made by setting, say R2 to the address of the highword in the source, R3 to the address of the high word in the destination string, and the top two bytes on the stack to the number of words in the string.

A DOS instruction sets carry to 1 so that the sign bit will be loaded upon moving the first word, and no other word. Thus, the sign, parity, and zero condition codes are valid for the entire multiprecision word that has been moved.

Equivalently, R1 could be placed over the high word of the destination R2 over the high word of the source, and the length of the string to be moved could be at the (double byte) word with address Q + 2.

Of course, the above routine is also the basic multiprecision PUSH operation to prepare a multiprecision number on the operational stack for arithmetic or logical operations. The equivalent multiprecision POP can also be used as a move instruction if R1 is set over the low word of the source, but it does not change the condition codes. R2 is set over the low word of the destination in either case. For this, note that the DO instructions set the carry stat to 1 or 0. Occasionally, one needs to retain the old value of the carry stat. An example of this appears in the multiplication algorithm. This can be accomplished by setting up the DO statement before the carry bit is determined and using a REP statement or END statement that does not cause the section of code that set up the carry stat to be repeated

BINDER AND PROTECTION CONVENTIONS

The mode bits support a memory scheme for binding pages and protection. The basis for this binding scheme is as follows: Suppose two memory controllers have the same value of PAGE, say page 0, but one has mode bit E0 on and mode bit E1 off, while the other has mode bit E0 off and mode bit E1 on. If register R1 points to word 10 and a push is made, the word will be written in location 9 on the second page. If register R0 points to word 9 and a fetch is executed, the word is taken from the first page, not the second. This allows one to use each register separately in a different memory space. Of course, if both mode bits E0 and E1 are on or off together, the memory spaces are identical.

However, having different memory address spaces has the following advantages. A program instruction sequence can be stored in pages enabled for R0 and no other register. This space can be written by the complier or assembler completely independent of the buffer space required by the program. The operational stack can be in pages enabled for R1 and R2. It will never overwrite the program. A data structure (permanent data) can be stored in pages enabled for R3. Alternatively, R3 can be enabled for some of the pages that R0 is also enabled to access data made available from the complier.

Again, R3 can be assigned independently from the assignments from the stack and program address spaces. In fact, that address space can be used to store a complete, unmodified program from this machine or another machine and that program can be traced or simulated.

A problem arises when an address using, say R0, does not correspond to a PAGE having the enable E0 on (Page Fault). A TRAP is executed. The memory manager will pull the missing page in. As we show in the discussion of the memory manager, it is possible to determine which pointer register is being used when the Page Fault occurred. The high order eight bits of this address identify the missing page; however, that page may correspond to different virtual memory segments because it may be part of the stack or the data base or program segment. To determine which virtual memory segment to bring in after a page fault, a binder table is examined. Each pointer register may have a different binder or several pointer registers may share a binder. When it is known which pointer register caused the Page Fault, its binder is examined. Each binder will be stored as a left matrix of a binary tree. The nodes of the tree contain an upper and lower page number, a mode vector, and a disc or secondary storage address for each group of pages stored on the same contiguous space of secondary memory and having the same mode. In many cases, the binary tree may therefore be just one node, The binders define the operation of the memory space. A program can load, for example, by clearing E0 in each page except the one we are on, bringing in the binder for R0, and then jumping to the starting address. This will immediately cause a Page Fault, and the memory manager will begin loading the page for the first program segment. Other pages for the program will be brought in as Page Faults are met when R0 is used to address memory. The other binders similarly define the other memory spaces.

The complier or assembler will set up the binder for R0. This is the program descriptor. Since the binders can be easily moved in or out, a call for a task will be handled by bringing in a new binder, as discussed above. Thus, the new task will dynamically overlay the former task. This means the complier or assembler can always start at location zero. Using this convention, there is no need to relocate the program because the binders change to overlay the old program. A relocatable loader need not be used.

Protection and allocation of secondary memory is handled by means of trees, like binder trees. Initially, the system owns all of memory, which corresponds to a single node. As programs request space, the tree is grown, putting the space assigned into a new left "son" node, the space below it in a new right "son" node, and the unassigned space above it into the old node. The user then can allocate his memory space. The tree is grown in the same way. As he allocates space, he may also set the write protect mode bit or other bits to restrict the use of the allocated space. Successive users can only AND into the mode bits. They cannot remove protection mode bits. By enabling only R0, he can enable the memory space only for instructions. Also, any space that was allocated by the system or a user can be repossessed by him later. Note that only the operating system, in the privileged mode, can change protection and enable bits. A user will request changes by a trap to the system. His credentials will be examined. If all is acceptable, the system will change the mode bits. This can assure complete protection and privacy.

PRIVILEGED OPERATION

Privileged mode is entered by means of user or hardware TRAP $n$ instruction, where $n < 16$. The operation of the trap depends upon whether it is externally evoked or evoked by the CPU. The TRAPS of Table IV will be discussed. Each trap is handled in the same way to save STATUS and pointer registers.

TABLE IV

| | |
|---|---|
| TRAP 0 | I/O Trap for poling |
| TRAP 1 | Parity Error for data transmission |
| TRAP 2 | Register Page Fault |
| TRAP 3 | Direct Address Page Fault |
| TRAP 4 | Control Stack Check |
| TRAP 5 | Operational Stack Check |
| TRAP 6 | Memory Refresh Trap |
| TRAP 7 | Privileged Instruction Trap |

If the program that is in user mode executes a TRAP $n$, $n < 7$, a TRAP 7 instruction (Privileged Instruction Trap) is executed instead. If the program that is in the privileged mode executes a TRAP $n$, $n < 16$ instruction, it is executed directly. Upon executing a TRAP $n$, $n < 16$ instruction, the program counter R0, which points to the next instruction, is put on the control stack, the CPU status word, then a zero word is put on the control stack, and CPU user mode status U and interrupt enable I will be set to 0.

An I/O device can evoke a TRAP 0 as follows. A memory cycle begins and ends with the lagging edge of the clock line. During a memory cycle, K is held to the same value throughout the cycle to tell the machine controllers what to do in this cycle and the next cycle. When the memory control link K has value for a decode memory cycle, then a 1 can be OR'ed into the CRY input of the CPU. This sets INT-REQ. If the CPU interrupt enable stat I is 1 at the beginning of the next instruction, then the interrupt memory cycle is begun in place of a fetch cycle. The trap address 00 . . . 0 is transferred in the cycle just after the cycle when K has the value for poping the word pointed to by pointer CSP off the control stack and GEN has the value 0. This normally envokes a TRAP 0. The program counter, R0, which points to the next instruction, the STATUS vector and a zero word are pushed into the control stack, and CPU status U and I are cleared. The trap handler can then pole the I/O requests until it located the first device. The memory controllers will also evoke a TRAP 0 if their I mode bit is 1. This is set in memory controllers if a parity error has been detected and that memory controller is about to write data. Thus, the poling routine must also check the mode vectors of the memory controllers.

At that time that the trap address is transmitted, the I/O device can insert a different address on data buss L by wire OR'ing with open collector gates. This address must be $2n$ where $n$ is the trap number since each address includes two eight bit words on the stack of page H. Its only condition is that the I/O device requests service and that MK was POP CAP and GEN had a value of 0 in the previous memory cycle. Note that a priority network can be used as an input in place of GEN, if the highest priority device in this network is the CPU. (The CPU informs the priority network that it itself has a trap to be honored if GEN is 1.) Consequently, each I/O device can cause a TRAP $n$, $n < 128$ operation to be executed immediately (TRAP $n$ 64 ≤ $n$ ≤ 127 operations cannot be executed as normal instructions. But like TRAP $n$ instructions, the new value of R0 is taken from locations $(2n+1)$ and $(2N)$ on page H.) Moreover, a hardware priority circuit can be used to select the I/O device.

Traps that enter the privileged mode (set STATUS bit U to 0) also clear CPU stat I, the interrupt enable. CPU stat I can be set or cleared by the instructions when the operating system wishes to re-enable or disable interrupts. The user may not execute these instructions because only the operating system has the need and the right to change the interrupt enable stat.

A page fault or parity error can cause a TRAP 1, TRAP 2 or TRAP 3 instruction. These operations are explained in the next section; it should be noted, however, that the current instruction is halted in mid-execution on such a fault or error and the program counter R0 pushed onto the control stack is the address of the instruction that caused the fault or trap, not the address of the next instruction. The condition code and another word, depending on the type of Trap, is pushed also. The execution of such a trap causes the P and I CPU stats to be set, however, like the other traps.

Upon pushing or popping words on the control stack, if the rightmost seven bits of the address CSP are all 1's before changing CSP, a TRAP 4 will be executed at the beginning of the next instruction, causing the program counter R0 and STATUS to be saved as described above. Note that this trap is executed when a page boundary or mid-page address is crossed, which serves to determine if the memory space alloted to the control stack has been used up. The system will compare the value of CSP at this time to its (SYSGEN-defined) upper and lower limits. If CSP is within bounds, processing is resumed, otherwise the program has to be aborted.

In general, it is necessary that the top of the control stack be in active memory at all times (i.e. it may never be paged out to secondary memory). Otherwise, a page fault will push R0 onto the control stack, causing another Page Fault. Information needed to resume the program is then lost. Under normal operation, however, the entire control stack can be stored in a half a page. Finally, note that if the control stack overflows, causing a control stack check, the trap that handles it will attempt to write up to six more words on it. If programming is to be resumed, the next six words (lower in address to) in the control stack must be in active memory and may not be used to store useful information.

If conventional memory is used (an MKH controller is in the system) and the operational stack is pushed or popped, crossing a page boundary (the rightmost eight bits of R1 are all 1's before R1 is changed) and mode bit F in the MKH controller is one, a TRAP 5 is executed at the beginning of the next instruction. R0, pointing to the next instruction, and the status of the vector are saved as usual. This permits the operating system to check that R1 is between its assigned limits, in the same manner as the operational stack check. This can be prevented, however, by clearing the F mode bit in the MKH controller. In virtual memory systems (no MKH controller in the system), this technique is not needed, so this trap will not occur.

The mechanism for the Operational Stack Check Trap (TRAP 5) is as follows: When R1 has its rightmost eight bits all 1's, an MKH module will request an I/O interrupt. When the I/O interrupt trap is entered, the number 10 is placed on the data link L to execute a TRAP 5 instruction and a Z set to 1 instruction. If a hardward priority network is used, MKH must be the next highest priority device after the CPU. Because this stack check is not repeated, any trap initialed by the CPU parity error, etc. must also check the operational stack pointer to see if it is out of bounds.

If dynamic memory is used, it must be refreshed periodically. This is accomplished by a Memory Refresh Trap, TRAP 6. It is evoked by setting L-IN to 1 on the CPU at any time other than during an arithmetic-logic memory cycle. When evoked, a TRAP 6 instruction is executed after the current instruction is completed, which puts the program counter, pointing to the next instruction, on the control stack and clears P, U and I to 0 to inhibit future interrupts until the softward sets these bits.

MEMORY MANAGEMENT

When a word is found to be missing upon addressing it or a parity error is found on receiving a word, the CPU is informed via the memory priority rail (FIG. 29) and immediately stops executing the instruction. It begins to execute a TRAP instruction. The operation of the CPU is discussed in these cases and a sample memory management program that can bring in a page containing the missing word is given.

There are three different cases resulting in different procedures and ending in different traps. The procedures have to account for the fact that one or more pointers may have been moved up to the time of the Parity Error or Page Fault from the time of the beginning of the instruction. After the Trap is executed to bring in the missing page or correct the parity error, the instruction must be retired. So the procedure must set all the pointers back to the beginning of the intersection. Even R0 is to be moved back to fetch the instruction, so that in comparison to the other traps, the return address on the control stack points to the instruction that failed and not the fetch instruction. This operation is called pointer correction and has been previously described as the Back-Up Logic in the CPU.

The first case is the Parity Error. If the CPU detects a parity error and the CPU parity error enable bit P is 1, a Parity Error Trap is executed. The CPU corrects the pointers, then pushes STATUS and R0 onto the control stack as it executes a TRAP 1 instruction as in all TRAP instructions. The trap handler should retry the instruction once and, on a second parity error, either abort the program or attempt a column parity check, coordinate and correct the error using the ERR register if it is available. (A fast real time clock is required to determine if the instruction has been retried once.)

The second case is a Page Fault in direct addressing. This occurs in direct addressed instructions. The CPU corrects the pointers, then pushes STATUS and R0 onto the control stack as it executes a TRAP 2 instruction. The format is the same as for all TRAP instructions. The trap handler can determine which page is missing by getting the byte at the location just below that pointed to by the old value of R0, which is now on the control stack. The trap handler will bring the new page in as will be described shortly.

The third case is a Page Fault in register addressing. The CPU first corrects the pointers and then pushes the two byte R0 (the address of the instruction that caused the page fault) and the one byte condition codes, STATUS, on the control stack. The trap handler recovers the missing page number and brings in the missing page.

The format for the low order byte put on the control stack is the following:

| | |
|---|---|
| 0 Class | Mode Reg. 0 |
| Class- | 00 read, increment/decrement after addressing |
| | 01 write, increment/decrement after addressing |
| | 11 write, increment/decrement before addressing |
| Mode- | 00 no increment |
| | 01 increment |
| | 11 decrement |
| Reg- | Pointer Register that was being used at the time of the fault |

The class can be used to determine whether reading or writing in memory was being done at the time of the fault and whether the pointer was moved before or after the address was calculated, if the pointer was moved. Mode shows which way the pointer was moved. Register shows which pointer register was used and, therefore, which binder should be examined for replacement.

For either type of page fault, a page is to be brought in. Generally, a page must be put back into secondary memory to make room for the page to be brought in. This is determined by examining the TIME register in each memory controller. The one with the largest value of time is to be replaced; however, it may or may not already exist in secondary memory. The write flag F of its MODE register (on an MKL chip) is set to 1 if new data appears on the page. In this case, it must be written back to secondary memory. If F is zero, the new page can be brought in immediately.

It should be noted that, as pages are being examined to select one to be removed, some pages cannot be removed. These include ROM's and RAM's that store the control stack, memory manager, device handlers, or binder tables. Such pages are said to be anchored. The program has to skip by these pages, ignoring TIME in them, to determine which page is to be removed. It is generally convenient to place anchored pages together physically in the memory chain (See FIG. 29) so that they can be skipped as a group. Because the IPL ROM and other system program pages must override user pages if any addresses are duplicated in both the system and user programs, the anchored pages are higher in priority.

An example of a memory manager program to determine simultaneously which page is missing and which page is to be removed for a register addressed page fault is shown in Table V attached hereto.

ARITHMETIC/LOGIC OPERATIONS

Arithmetic and logic operations are defined for single and multiple precision. In both cases, R1 points to the top of the operational stack and works as follows:

For monadic single precision operations (INC, NEG, etc.), the work pointed to by R1 is replaced by the word which results from the requested operation and the CPU status bits or condition codes C, Z, N, V, and M are adjusted if necessary.

For dyadic single precision stack operations, (ADD, AND, etc.), the word below the word pointed to by R1 in the operational stack is replaced by the results of the requested operation of the work pointed to by R1 and the word below it. In all operation, the CPU condition codes are adjusted if necessary and pointers R1 and R2 are incremented.

For dyadic single precision stack operations, (MADD, MAND, etc.), a word at an address n is read directly from memory and the word pointed to by R1 is replaced by the results of the requested operation of the word pointed to by R1 and the word at n. The CPU condition codes are set as necessary.

TABLE V

| | | | |
|---|---|---|---|
| | INTEN | | Enable Interrupts |
| | STR | 1, R1 | Store R1 |
| | LDR | 1, STKP | Load New Stack Pointer |
| | PSHR | 3 | Push R3 onto stack |
| | PSHR | 2 | Push R2 onto stack |
| | PSHD | R1 | Push R1 onto stack |
| | PSHS | CS | Push R0 onto stack |
| | POPD | R0 | Store R0 |
| | DECR | 1 | Move Stack Pointer back to R0 |
| | DECR | 1 | |
| | POPS | CS | Push the Microcode that was faulted |
| | DECR | 1 | Copy the Microcode on the stack |
| | ZERO | | |
| | PUSH | 1— | |
| | MAND | SEVEN | Mask out all but the register number of microcode |
| | SRC | | Right justify the register number of the microcode |
| | DOS | 0 | Set up a do loop using the register numbers |
| | ENTR | '10000000' | Enter a one in the leftmost bit for shifting to reg. |
| | BRNT | LS | Branch out of loop if value of Count is zero |
| | SRC | | Shift right |
| | REP | | |
| LS: | INCR | 1 | Move pointer to first copy of microcode |
| | MBIT | WRITE | Test if code was writing |
| | DECR | 1 | |

TABLE V-continued

|  |  |  |  |
|---|---|---|---|
|  | BRNE | LL | Go to LL if code was reading |
|  | MIOR | WRITE | On in write enable bit if writing |
| LL: | POP | MDST | Store word in MDST, use later to check mode bits |
|  | MAND | SEVEN | Mask out all but reg. no. of first copy of microcode |
|  | POP | REGNO | Store in REGNO |
|  | DECR | 1 | Move pointer back to masked number |
|  | ADGR | 1 | Add to stack pointer to index faulting register |
|  | POPD | PAGENO-1 | Store faulting register at PAGENO-1 |
|  | LDR | 1, STKP | Reload new stack pointer |
|  | SETQ |  | Set Q and prepare to step through pages |
|  | DOD | 0, ARG | Set up do loop with no. of anchored pages |
|  | STEP |  | Step over anchored pages |
|  | REP |  |  |
|  | ZERO |  | Zero top word on stack |
|  | DECR | 1 | Move pointer back to it |
|  | DOD | 0, ARG | Set up do loop with No. of unanchored pages |
| LOP: | PSHS | PAGE | Push PAGE |
|  | MCMP | PAGENO | Compare with high order byte of faulting microcode |
|  | BRNE | SS | Branch not equal |
|  | PSHS | MODE | Match, Push MODE |
|  | MBIT | MDST | Compare with mode of faulting microcode |
|  | BRNE | SS | Branch not equal |
|  | PUSH | ONES | Match, push ones onto stack |
|  | POP | FLAG | Pop into FLAG setting it |

For monadic partial multi-precision operations, (PINC, PDEC, etc.) the word pointed to by R1 is replaced by the results of the required operation and R1 is incremented and the CPU condition codes are set.

For dyadic partial multiprecision operations, R1 points to the top of the stack and R2 points to the top of the next number on the stack. Both numbers are arranged so that the least significant byte is on the top and are pointed to by R1 and R2. The word pointed to by R2 is replaced by the results of the requested operation of the words pointed to by R1 and R2 and R1 and R2 are incremented and the CPU condition codes are set.

In general, one (or two) multiprecision arguments of the same length are on the operational stack, one above the other, and the length is on the stack on top of them. The result is left on the stack in place of the higher addressed argument. This corresponds to the short subroutine convention.

After a multiprecision add or subtract, an overflow can be detected for branching to a fixup routine. For unsigned binary numbers, an overflow for addition is indicated by the fact that the carry stat is 1, and for subtraction, that it is zero. For signed (two's complement) numbers, an overflow is indicated for either operation when V is 1. In a double precision multiplication, the multiplicand (higher addressed number on the stack) is moved from the free end of the stack and its place is filled with zeros. The multiplier (lower addressed number of the stack) and the field filled with zeros froms the partial product. Each operation in the principle loop starts at the high addressed end of the partial product and shifts the partial product/multiplier right one bit. The bit that is shifted out is the ith multiplier bit. If it is 1, the multiplicand is added to the two most significant bytes of the partial product. Whether adding is done or not, the pointers are then replaced for another loop cycle. To support this loop, the pointers to the high end of the partial product to start shift and to the second high byte of the partial product to start the add are required. They are found as the multiplicand is being moved to the free end of the stack. Finally, after the loop is completed, an extra shift is required. The carry bit from the last add for the loop may have to be shifted.

String searches are generally required in text editing and intelligent terminal operations. The present system can find a programmed specific character in a string of characters, by performing a comparison loop with a branch for a match. The value of count indicates the characters location in the string.

Another example of a search is a single binary tree search. It is like many operations in data structures such as trees, directed graphs, rings, and cylinders. One is searching for a single byte value stored at address A in a tree shown in FIG. 7. The tree is stored so that the values V in each record are in increasing numeric value in a postorder transversal of the tree (If $V_1$ is greater than $V_2$, then either $V_2$ is in a left son of $V_1$ or $V_1$ is in a right son of $V_2$ or $V_1$ is in a tree to the right of a tree $V_2$ is in.).

A comparison in a loop is set up where R1 points to the root of the tree. When the branch to FOUND is taken, R1 points to the node containing V equal to the byte stored at A. If the character is not there, a branch is taken to NOT FOUND.

DECIMAL ARITHMETIC

This machine supports excess-three unsigned decimal numbers and symmetric signed decimal numbers in both packed and unpacked formats.

An excess three digit is a four bit code obtained from a BCD (8421 code) digit by adding three to each digit. For example, zero is represented by 0100. Excess three numbers are easily converted to and from BCD.

Excess-three notation has the following properties. If two excess three numbers are added and the result is less than sixteen, the result is in excess six. It can be converted to excess three by subtracting three. If the result is greater than 16, a carry is generated and the result, modulo 16, is in excess 0. It can be made excess three by adding three. Also, two unsigned excess three numbers can be subtracted, say A-B, by simply logically inverting B, adding it to A and adding 1, as in unsigned binary numbers and then performing the same correction step as for addition. Finally, a left shift is the same as doubling a number or adding it to itself. The correction step can be executed after a left shift to double an excess three number.

In order to conserve hardware and to minimize the need for extra instructions, binary addition, subtraction and left shift instructions are used. A pair of excess three digits is put in each byte. These instructions set the carry bit and the mid-carry bit, which are the indicators after such operations of whether the effective sum of the higher digit and lower digit, respectively, in the byte are greater than sixteen. A Correct Excess Three (CXS) and a Partial Correct Excess Three (PCXS) perform the required addition or subtraction of 0011 to each digit to correct the result of each digit separately.

For CXS, the address pointed to by R1 is loaded with a pair of four bit vectors, A, B where A is the first four bit word of the word pointed to by R1 two's complement plus 0011 if C is one, otherwise A is first four bits two's complement minus 0011. B is the second four bits of the word pointed to by R1 two's complement plus 0011 if M is 1, otherwise, B is second four bits two's complement minus 0011.

PCXS is the same as CXS except that the word above the word pointed to by R2 is operated on.

A single precision decimal addition can be accomplished as follows: If the top two words on the stack are to be added, the sequence ADD, CXS will be executed. If a number at location A is to be added to the top word of the stack, the sequence MADD A, CXS is executed. For multiprecision, ADD, PCXS is executed.

Signed decimal numbers are represented by adding the decimal digit 5 to the leftmost digit then coding each digit in excess three. This representation is called symmetric signed decimal. For example, zero would be represented as 50, which would be coded as 10000011 for a two digit precision, or 500, which would be coded as 1000 0011 0011, for three digit precision, and so on. It should be observed that all positive numbers and zero have the leftmost bit equal to one and all negative numbers have a zero in that bit. This is the reverse convention to two's complement numbers. Addition is done as for unsigned decimal numbers. Five is added to the most significant digit, and overflow is tested. The overlow test is the same as for two's complement numbers. Namely, an overflow exists if the signs of the inputs agree and the sign of the ultimate output disagrees. To test for these sign bits, branching must be used because the V bit is not an indicator of overflow for either the multiprecision add or correction addition of 5.

A general test for greater than, equal to and so on, can be accomplished by a standard comparison of unsigned binary numbers. A routine can compare two symmetric signed numbers, branching to A if the upper one (having higher address) is less than the lower one, and to B if they are equal. The length, as usual, is on top of the stack. Decimal numbers cnn be in unpacked form, as they may come from the keyboard. In unpacked form, the left four bits are all ones (this is called a field "nibble") and the right four bits are in excess three. This format can be obtained from any standard keyboard code by simply adding a constant to each byte from the keyboard. The representation of zero is 11110011, of one is 11110100, and so on, storing one digit per byte.

CONFIGURATION

The CPU and memory controller described in earlier sections are, in fact, components intended for a variety of system configurations. It is expected that different systems will be configured for different applications. The two most important techniques for configuring computers are pseudo-memory and n-CPU structures.

PSEUDO-MEMORY PORTS

The memory controller can be used to provide addresses to one of 16 decoders whose outputs select registers for reading or writing data on the memory data link L (See FIG. 8). Since these registers appear to be memory locations, one can address them using direct addressing, put the stack pointer R1 over them to operate on them directly or even fetch instructions from them. They can be enabled and protected like conventional pages of a virtual memory. These registers can be connected to I/O devices or shared between computers. Because they can be addressed as if they were memory, but are not essentially used to store data, they are called pseudo-memory ports.

In a virtual memory system, a separate memory controller will be tied to the decoders to address the registers. Other memory controllers will be connected to 256 × 9 pages of active memory. In a conventional memory configuration, the MKL controller can be used for both the IPL program and the pseudo-memory port. The IPL program and device handler for the IPL can be put on a PROM or ROM that occupies the first half of the page by appropriate connections to the address lines and registers can be addressed at other locations. So even in conventional memory systems, the registers can be disabled to prevent the user-programmer from harming the devices controlled by them.

Figure 32:
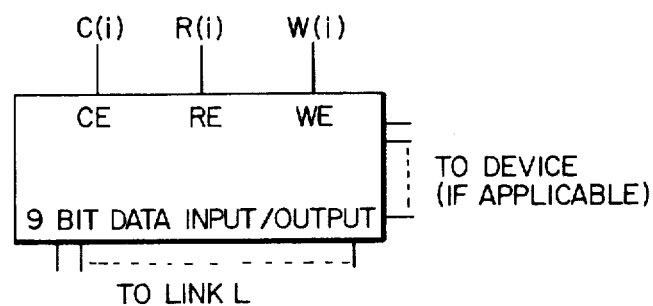
FIG. 32 is a block diagram of a Register for Pseudo-Memory portion configuration.

The requirements on the registers to be used in pseudo-memory are the following (See FIG. 32). If parity checking is to be used, a nine bit input-output link will be connected to the CPU memory data link L. Eight bits of data are sent or received on L. When the register sends data, it has to add a parity bit to the ninth bit to make the parity even. Connections to or from the device must be made on separate pins from those connected to L. If the parity check status bit P is zero, however, the CPU can ignore the parity input.

Figure 31:
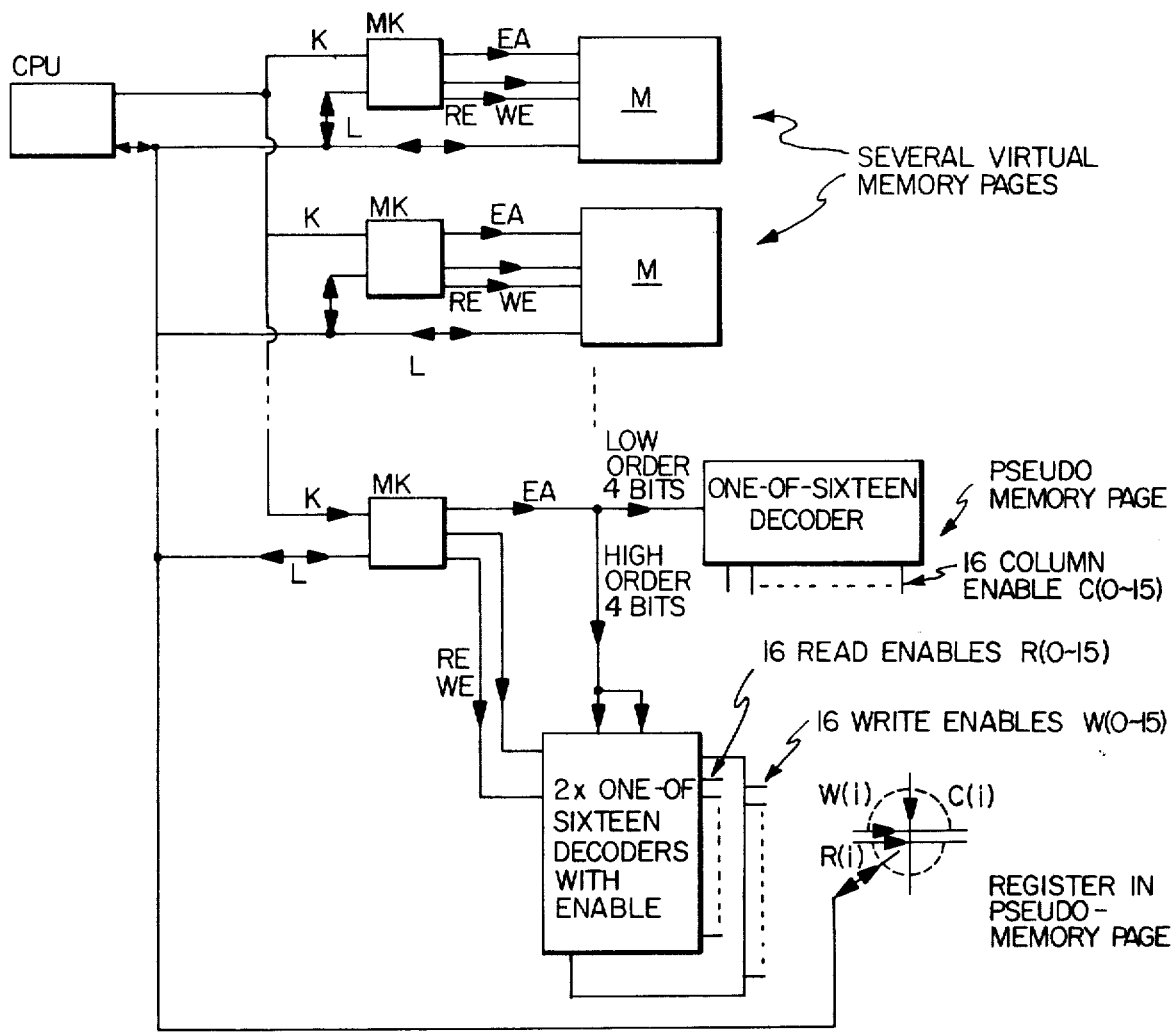
FIG. 31 is a schematic or a preferred embodiment configured as Pseudo-Memory Parts.

Each input/output register requires a column enable (CE), a read enable (RE), and a write enable (WE). If a register is read-only, WE Can be omitted, and if it is write-only, RE can be omitted. In general, CE and RE must both be 1 for register to load into L and CE and WE must both be 1 for data on L to be loaded into the register. This permits coincident selection of the register, using one of sixteen decoders, as shown in FIG. 31. One decoder decodes the low order four bits. One is enabled by RE from the controller and outputs read enables to the registers. The other is enabled by WE from the controller and outputs write enables to the registers.

It should be noted that the register can send a parity to the CPU. It can be implemented in such a way that if something abnormal has happened to the register (e.g., a counter is being written in at the same time it is being incremented), the wrong parity is returned to the CPU. This can be used to inform the CPU that the data is not correct.

n-CPU CONFIGURATIONS

Figure 33:
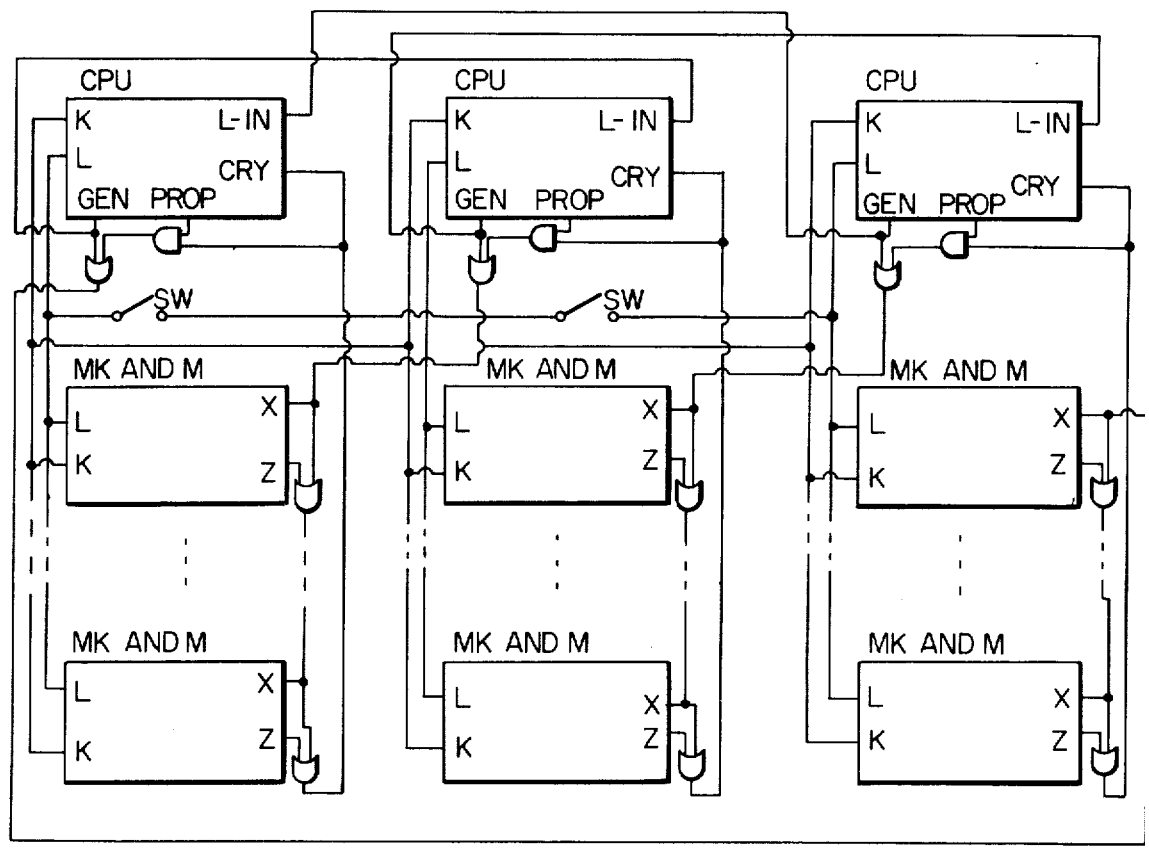
FIG. 33 is a schematic of a preferred embodiment configured as a 3-CPU Virtual Memory.

In order to use the CPU in minicomputers and larger structures, it is necesary to be able to parallel several CPU chips. Each chip will have its own memory, which may be virtual or conventional, and data link L, the control link K will be common to all chips and memories. A CPU, its data link and memory, will be called a (byte) slice. See FIG. 33 for a 3-CPU virtual memory configuration. There is considered a conventional configuration at the end of this section.

For data operations, each slice will have a page with the same page address to store data. (The binders for R1, R2, and R3 will have the same addressed words in each slice.) The values in the registers R0 and CSP are the same. So a PUSH 2+ will read the word pointed to by R2 and write it on top of the stack in all slices simultaneously. The switches marked SW in FIG. 10 are open in this case. We call this word mode operation. Arithmetic-logic operations generally works the same way for reading or writing data in memory. The operation, such as addition, is done between temporary registers A and B in the CPU (See FIG. 1). During this time, the priority link through memory is used as the carry link for addition by insuring that the Z outputs of all memory controller chips are zero. For n-CPU structures, this cycle is made longer to accommodate the propagation of the carry bit through the carry look ahead tree priority circuit.

In order to identify the operation of the CPU, the two STRUCTURE inputs are used. They are also used to start the first fetch cycle. When STRUCTURE is 00, the CPU is inoperative. GEN is 0, PROP is 1 and K is 0. When STRUCTURE changes from this value to any other value, the machine begins a fetch cycle. When STRUCTURE is 01, the CPU behaves as an eight bit wide self-contained CPU, as we discussed in earlier sections. When STRUCTURE is 10, the CPU behaves as a slice other than the leftmost slice, and when 11, as the leftmost slice of an n-CPU configuration. We call the first (10) case a slave CPU, and the second (11) case a master CPU.

In n-CPU configurations, only the master contains valid condition codes (STATUS) and COUNT values. The C, Z, N, and V codes after arithmetic operations are the carry, zero, sign and overflow status for the whole word. M and V after logic or push operations, are the midcarry and parity of the leftmost byte only. The master decodes the instruction in its I register to derive control orders for its ALU, and to drive the memory control link K. It uses its own condition codes to determine branching. The slave decodes the instruction in its I register, but controls only its own ALU. (A zero is wire-ORed into K by a slave.)

In order to insure that the I registers and registers R0 through CSP are the same in all slices, the switches in FIG. 10 are closed at the time these registers are loaded to join together links in all slices. A single byte is read or written when these switches are closed. This is called byte mode. Thus, there should be only one page in the entire memory (not one in each line) that stores values to be sent to these registers through the common link. (Cases will be examined where data for these registers is taken from words below.) The binder for R0, from which instructions and direct addressed operands are taken, and the control stack should be single width memories. Suppose, for example, that page 8 in binder 0 stores instructions. Then there is just one page 8 enabled for R0 in the entire memory, rather than a page 8 enabled for R0 in each slice.

This technique has the disadvantage that a triple length instruction will have to be picked up in three successive fetches rather than in one parallel fetch. It has the advantage, however, that the same object code can be put in the binder for R0 independent of the width of the memory. This scheme also has the advantage of simplicity of operation because byte alignment is not required when instructions are executed.

There are some cases (e.g., POPR) where data is read in word mode and distributed for writing in byte mode. In such word-to-byte operations, the leftmost byte of the word is used. POPR will read two successive words from the operational stack, take the leftmost byte from each word and then put this into the indicated register. Conversely, if data is read in byte mode and distributed for writing in word mode, the byte is replicated to fill out the word. PSHR, for example, will replicate the leftmost word on the stack, then replicate the rightmost byte of the indicated register and push this word on the stack.

It should be observed that STRUCTURE is set on two input pins to each CPU. These can be connected to registers in the pseudo-memory, which in turn can be changed by the program. Hence, the program can change the structure, say from 24 bit wide to eight bit wide memory, to more efficiently handle character data. It can do this by setting STRUCTURE in the middle and right CPU of FIG. 33 to 10 for 24 bit operation and to 00 for eight bit operation. Theoretically, a variety of configurations can be attained in a cellular computer consisting of such CPU's. See "A Varistructured Fail-Soft Cellular Computer," Proceedings of the First Annual Symposium on Computer Architecture.

The operation of n-CPU conventional memory configurations is simple. A memory controller for conventional memory will send the same address lines to each slice. The mode of operation is then different only for byte operations. In all cases, a word is read or written in parallel. In byte mode, the bytes are tied together as in the virtual scheme. Consequently, a word storing an instruction or the control stack will have the instruction or control word in, say the leftmost byte and either zeros or the same code in all of the other bytes of the word. This implies a waste of memory. Several schemes can be used to alleviate this. For example, for the part of memory that will store only instructions, if it is fixed, one can make it only one byte wide. Other system configurations can be used for more sophisticated schemes.

From the preceding description of a preferred embodiment, it is evident that the objects of the invention are attained and although the invention has been described and illustrated in detail, it is to be clearly understood that the same is by way of illustration and example only and is not to be taken by way of limitation, the spirit and scope of this invention being limited only by the terms of the appended claims.

What is claimed:

1. A general purpose digital computer comprising:
   a central processing unit located on a first semiconductor chip;
   a plurality of memories located on a plurality of second semiconductor chips;
   a plurality of memory controllers associated with, and connected to, said plurality of memories, respectively, each located on a semiconductor chip other than said first semiconductor chip;
   a plurality of bidirectional lines interconnecting said central processing unit and said memory controllers for transmission of data and control bits between said central processing unit and said memory controllers;

each of said memory controllers including means for storing a mode vector which enables their associated memory for various operations;
a first logic means on each of said memory controllers for allowing said central processing unit access to their associated memory as a function of said bits on said bidirectional lines and said mode vector stored in said memory controllers.

2. The computer of claim 1 wherein said plurality of memory controllers are on semiconductor chips, other than the memories they control, and are connected to their respective memories by bidirectional lines.

3. The computer of claim 1 wherein said memory controllers are on the same semiconductor chip as the memory they control.

4. The computer of claim 1 wherein each memory controller includes means for storing a page identification of said memory controllers associated memory, said first logic means is connected to said page means and provides access as a function of a match of said page identification and said bits on said bidirectional lines in combination with said mode vector.

5. The computer of claim 4 wherein each of said memory controllers include priority logic means, said first logic means is connected to said priority logic means and additionally provides access as a function of priority.

6. The computer of claim 1 wherein said memory controllers provide an effective address and a read or write enable to its associated memories when access has been allowed by said first logic means.

7. The computer of claim 1 wherein said plurality of bidirectional lines include eight lines for transmission of data bits and six lines for control bits, and said memory controllers are connected to said lines in parallel.

8. The computer of claim 7 including a ninth data line, a parity circuit in said central process unit and a parity circuit in each of said memory controllers, said parity circuits produce a parity bit on said ninth data line for the bits on said eight data lines and check the received eight data bits against said parity bit.

9. The computer of claim 1 wherein each of said memory controllers include a TIME means for counting the number of times any of the other of said first logic means allows access to its associated memory.

10. The computer of claim 9 wherein each of said memory controllers includes a means for resetting said TIME means when said first means provides an access to its associated memory.

11. The computer of claim 10 wherein said central processing unit includes means for determining which memory controller has the TIME means with the highest count.

12. The computer of claim 11 wherein each of said memory controllers include means to prevent said TIME means from counting in response to an appropriate command from said central processing unit.

13. The computer of claim 1 wherein each of said memory controllers include a means for indicating whether said first logic means allowed access to its associated memory for writing therein.

14. A general purpose digital computer comprising:
a central processing unit on a first semiconductor chip;
at least a first and second memory controller on a second and third semiconductor chip, respectively;
at least a first and second memory connected to said first and second memory controllers, respectively.
a plurality of bidirectional lines connecting said first chip and at least said second and third chips,
a plurality of first storage means in each of said memory controllers, all of the corresponding first storage means on said memory controllers having the same content;
a plurality of second storage means in each of said memory controllers having, in combination, contents unique to their memory controller; and
logic means in each of said memory controllers interconnecting said bidirectional lines, said plurality of first and second storage means and an associated memory for performing memory stack operations using said plurality of first storage means.

15. The computer of claim 14 wherein said plurality of first storage means include first pointer (program counter) means for storing the memory address of the next computer instruction.

16. The computer of claim 15 wherein each of said logic means include means for allowing access of said central processing unit to said memory address of said first pointer means only for reading.

17. The computer of claim 14 wherein said plurality of first storage means includes a second pointer and a third pointer means for storing the memory address of the top of an operational stack and the next word of an operational stack, respectively.

18. The computer of claim 14 wherein said plurality of first storage means includes a fourth pointer means for storing the address of a control stack which stores control signals.

19. The computer of claim 18 wherein said central processing unit includes means for directing a memory controller to store subroutine return address or mode vector in the location on the control stack pointed to by said fourth pointer means.

20. The computer of claim 14 wherein each of said logic means includes means for incrementing or decrementing the contents of a first storage means in response to an order from said central processing unit.

21. The computer of claim 20 wherein said central processing unit includes a plurality of registers corresponding in number to said plurality of first storage means and means for incrementing or decrementing said registers when the contents of its corresponding first storage means is incremented or decremented per instruction.

22. The computer of claim 21 wherein said central processing unit includes means for returning said plurality of first storage means to their initial contents at the beginning of an instruction produced sequence by producing commands which zero said registers in response to a fault or error signal.

* * * * *